(12) United States Patent
Lindsey et al.

(10) Patent No.: US 12,103,574 B1
(45) Date of Patent: *Oct. 1, 2024

(54) METHOD AND SYSTEM FOR TRANSPORTING GOODS OVER SOFT-SAND BASED ENVIRONMENTS

(71) Applicant: BRIGHT HOUSE SALES LLC, Dacula, GA (US)

(72) Inventors: Stephen Lindsey, Dacula, GA (US); Denise Lindsey, Dacula, GA (US)

(73) Assignee: BRIGHT HOUSE SALES LLC, Dacula, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,823

(22) Filed: Jul. 25, 2023

Related U.S. Application Data

(63) Continuation of application No. 17/957,627, filed on Sep. 30, 2022, now Pat. No. 11,738,787.
(60) Provisional application No. 63/251,188, filed on Oct. 1, 2021.

(51) Int. Cl.
*B62B 1/12* (2006.01)
(52) U.S. Cl.
CPC ............ *B62B 1/12* (2013.01); *B62B 2202/52* (2013.01)
(58) Field of Classification Search
CPC .... B62B 1/12; B62B 1/20; B62B 1/04; B62B 2202/52
See application file for complete search history.

(56) References Cited

U.S. PATENT DOCUMENTS

| 3,546,944 | A | 12/1970 | Mack |
| 4,730,646 | A * | 3/1988 | Traub ................... A63B 47/008 141/4 |
| D345,842 | S | 4/1994 | Sloan et al. |
| 6,079,777 | A | 6/2000 | Simmons et al. |
| 6,131,925 | A | 10/2000 | Weldon |
| 8,662,004 | B2 | 3/2014 | Gardner et al. |
| 8,814,181 | B1 | 8/2014 | Weldon et al. |
| D890,538 | S | 7/2020 | Weldon et al. |
| 11,001,285 | B1 * | 5/2021 | Gayk ..................... B62B 1/002 |

* cited by examiner

*Primary Examiner* — Bryan A Evans
(74) *Attorney, Agent, or Firm* — Smith Tempel; Steven P. Wigmore

(57) ABSTRACT

A beach cart kit and method for transporting cargo over soft-sand may include a handle and a telescoping support member coupled to the handle. The telescoping support member allows the handle to move between several positions. A cargo deck may be coupled to the telescoping support member via a hinge. The hinge permits the telescoping support member with the handle to fold towards the cargo deck when an assembled beach cart is placed in a storage state. An axle may be coupled to the cargo deck for supporting two wheels. Each wheel is removable from the axle when the assembled beach cart is placed in the storage state. Each tire is inflated within a predetermined pressure range such that each tire rotates properly over soft-sand environments when supporting the cargo deck along with any cargo. The kit includes a tire inflation tool providing a predetermined circumference for each inflatable tire.

20 Claims, 32 Drawing Sheets

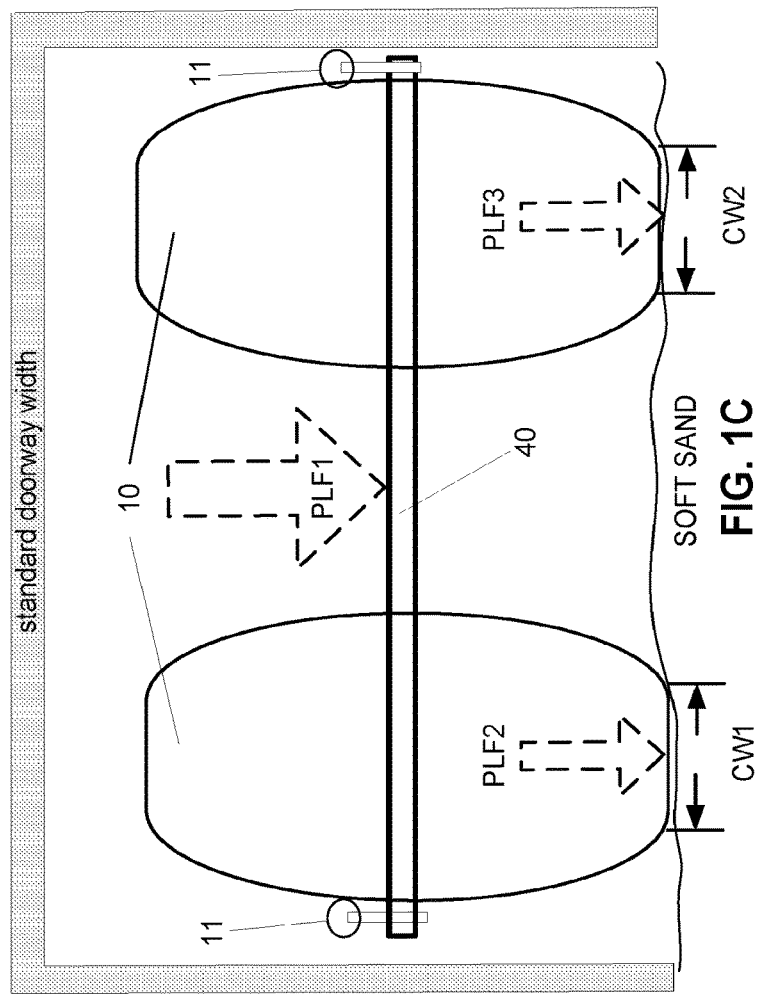
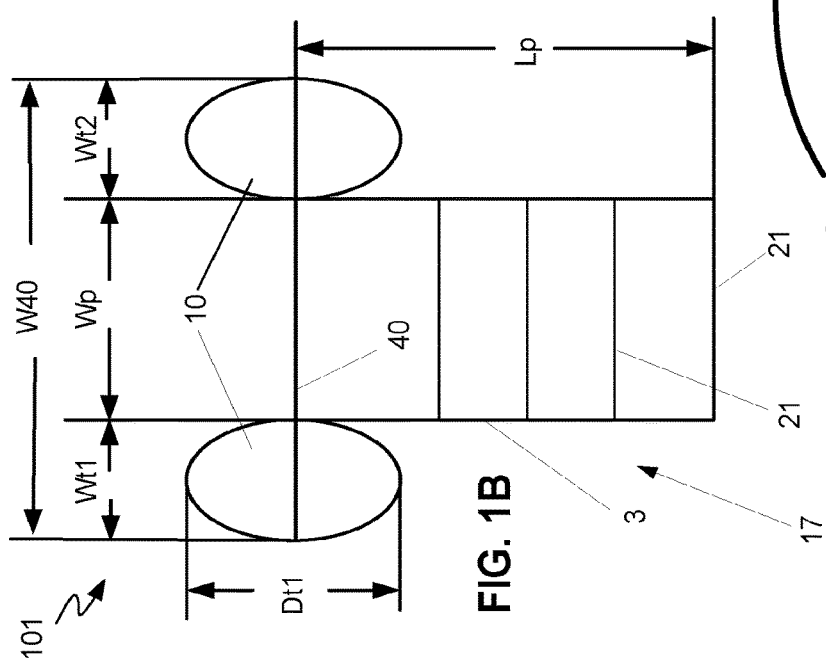
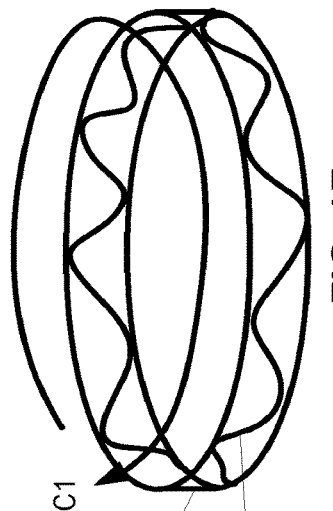
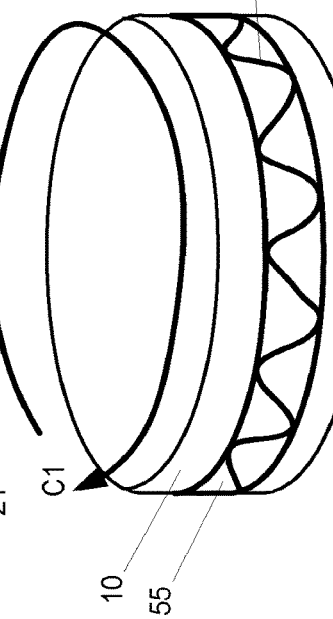
FIG. 1B
FIG. 1C
FIG. 1D
FIG. 1E

METHOD AND SYSTEM FOR TRANSPORTING GOODS OVER SOFT-SAND BASED ENVIRONMENTS

BACKGROUND

Prior art beach carts usually have included wagons and other types of carts which often had four wheels and wheels which had diameters less than ten (10) inches. Also, prior art beach carts often were manufactured with hard hollow plastic wheels or solid wheels which are not hollow.

With such small and hollow plastic and non-hollow wheels and with the number of wheels, such carts were often difficult to roll over beach terrains, which usually include soft sand. Further, when prior art beach carts are provided with loads greater than ten or more pounds, such weight may often prevent or contribute to the non-turning of the wheels for the beach cart when pulled across soft sand.

Another problem with traditional beach carts is that they can be very bulky and are often difficult to store in vehicles, such as in trunks of cars and/or cargo areas of small (i.e. mini-) vans. In addition to the cargo (i.e. items) a typical beach cart may haul, the cart itself may pose a significant problem with respect to its own portability and ability to be stored within a vehicle.

Another problem with traditional beach carts is their size with respect to door openings. Specifically, beach carts designed for outdoor terrains, like soft sand, are often wide so that they can hold or carry large objects. However, if a beach cart cannot fit through the size of a standard doorway, which is usually about 36.0 inches known as of this writing, then such a cart will require a user to unload it since the cart itself cannot fit through a standard doorway in a building.

Also traditional carts often had cargo platforms which did not permit the loading of odd-shaped items, such as, but not limited to, beach chairs and/or beach umbrellas.

What was needed in the art was an improved beach cart method and system so that maneuvering over soft sand-based environments may become easier while the beach cart system is carrying a load. Further, an additional need exists in the art for a beach cart system which itself is portable and can fit into storage areas of vehicles while also being able to carry loads through doorways of buildings when in its operational state.

SUMMARY

A beach cart kit and method for transporting cargo over soft-sand may include a handle and a telescoping support member coupled to the handle. The telescoping support member allows the handle to move between a first position and a second position. A cargo deck may be coupled to the telescoping support member via a hinge. The hinge permits the telescoping support member with the handle to fold towards the cargo deck when an assembled beach cart is placed in a storage state.

An axle may be coupled to the cargo deck for supporting two wheels. Each wheel has an inflatable tire, where each wheel is removable from the axle when the assembled beach cart is placed in the storage state. Each tire is inflated within a predetermined pressure range such that each tire rotates properly over soft-sand environments when supporting the cargo deck along with any cargo.

The kit includes a tire inflation tool providing a predetermined circumference for each inflatable tire. The tire inflation tool provides the predetermined circumference corresponding to the predetermined pressure range.

The predetermined pressure range may be between about 2.0 psi and about 3.0 psi and each tire diameter is between about 10.00 and 13.50 inches when a cart is assembled and loaded. Each tire may have a contact width on a sand surface between 3.8 inches and 7.2 inches when the assembled beach cart is loaded.

The predetermined circumference for the tire inflation tool may be about 42.0 inches. A ratio of the minimum contact width (CW) for each inflatable tire to maximum axle width for an unloaded cart expressed as a decimal is about 0.110, and the ratio of the maximum contact width (CW) for each inflatable tire 10 to maximum axle width (W40) for a loaded cart expressed as a decimal is about 0.200.

A beach cart system and method for transporting cargo over soft-sand environments includes a handle and a telescoping support member coupled to the handle. The telescoping support member allows the handle to move between a first position and a second position. A cargo deck may be coupled to the telescoping support member via a hinge. The hinge permits the telescoping support member with the handle to fold towards the cargo deck when the beach cart system is placed in a storage state.

An axle may be coupled to the cargo deck for supporting two wheels, where each wheel may have an inflatable tire. Each wheel with its inflatable tire may be removable from the axle when the beach cart system is placed in the storage state. And each tire may be inflated within a predetermined pressure range such that each tire rotates properly over soft-sand environments when supporting the cargo deck along with any cargo. The predetermined pressure range is generally between about 2.0 psi and 3.0 psi.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 1B illustrates exemplary schematic of the beach cart system and highlights the dimensions of the detachable/removable & inflatable tires which are coupled to axle via wheels and the lynch pin;

FIG. 1C illustrates an exemplary force diagram that includes a side view of the inflatable tires at the proper pressure and under a load, represented by payload forces (PLFs);

FIG. 1D illustrates a side view of an inflatable tire inflated at the optimal pressure range and being circumscribed by a tire inflation tool;

FIG. 1E illustrates the tire inflation tool separate and independent of the inflatable tire compared to FIG. 1D;

DETAILED DESCRIPTION OF EXEMPLARY EMBODIMENTS

The word "exemplary" is used herein to mean "serving as an example, instance, or illustration." Any aspect described herein as "exemplary" is not necessarily to be construed as exclusive, preferred or advantageous over other aspects of the inventive system and method.

Figure 1A:
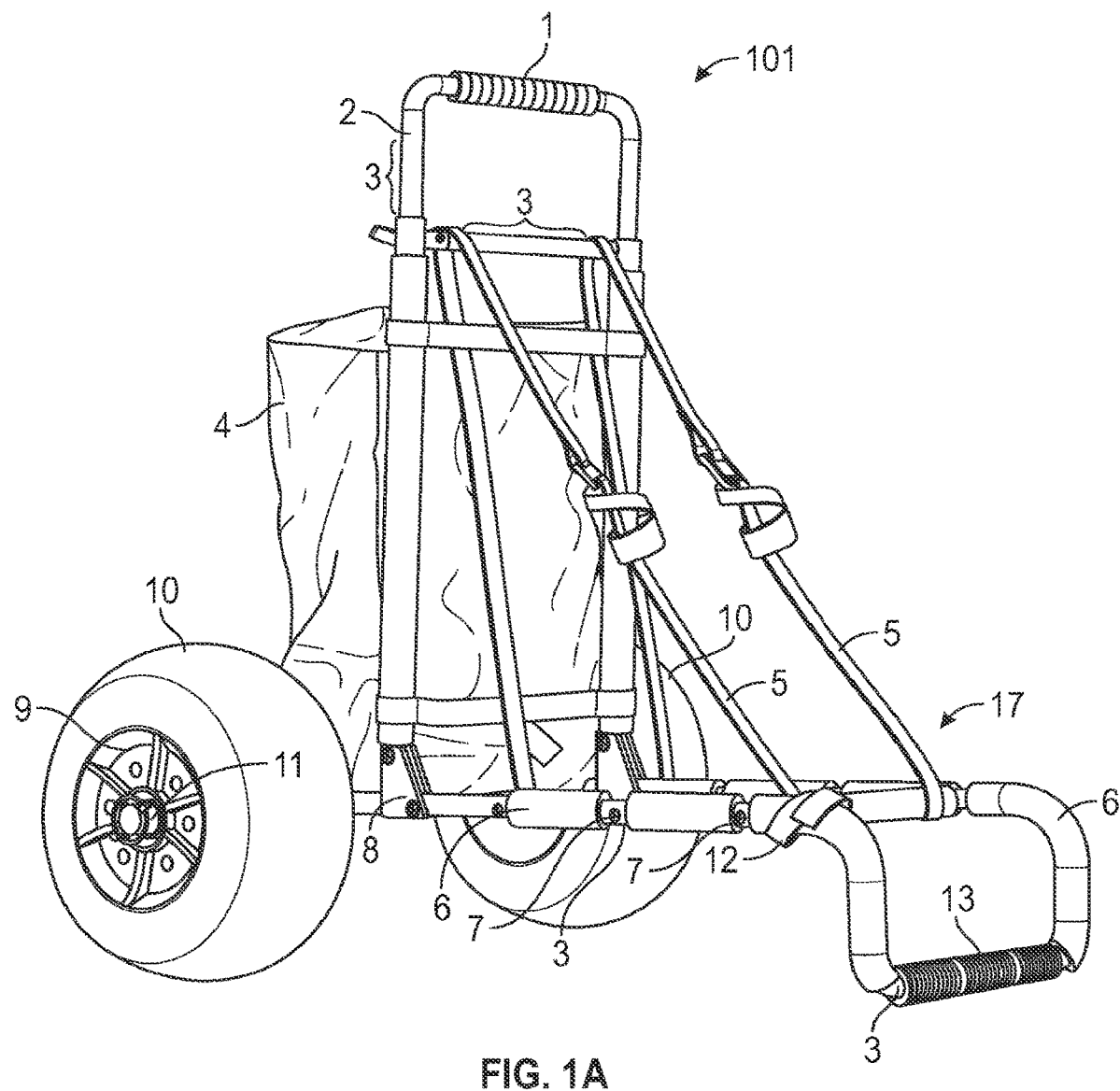
FIG. 1A is a side perspective view of beach cart system that includes a padded grip, a telescopic handle, hollow tubular frame members, a bag, and wheels which support, hollow, inflatable tires.

Referring now to FIG. 1A, this figure illustrates a side perspective view of beach cart system 101 that includes a padded grip 1, a telescopic handle 2, hollow tubular frame members 3, a bag 4, and wheels 9 which support, hollow, inflatable tires 10. The telescopic handle 2, tubular frame members 3, and most support structures of the beach cart system 101 are generally made from metal. One exemplary metal includes aluminum. Another metal is stainless steel. Usually, a metal which does not rust when exposed to water, such as salt water environments, is preferred.

However, other metals as well as other materials are possible and are included within the scope of this disclosure. Other materials include, but are not limited to, other metals, like steel, ceramics, composites, polymers, plastics, wood, and any combination thereof.

The beach cart system 101 may further comprise payload straps 5 and padding 6. The padding 6 may enclose or encase select metal frame members 3. The beach cart system 101 may further comprise hinges 8 so that the telescopic handle 2 may fold into or on the payload area 17 (see FIGS. 19A-19C for the folding function/aspect of system 101). The system 101 may further include a pin 11 for securing the wheel 9 to the axle 40 (See FIG. 23A). The telescoping handle 2 is illustrated in a "contracted" state in FIG. 1A (but See FIG. 2 for handle 2 in a "fully extended" state).

The pin 11 may comprise a lynch pin 11. Generally, lynch pins are a self-locking pin inserted crosswise as through the end of an axle or shaft 40. The circular ring at the end of the pin 11 "locks" in place when it is moved downward so one end contacts a surface of the pin. Such lynch pins 11 are available as of this writing and sold by G. L. Huyett of Minneapolis, KS. However, other types of pins as well as other fasteners are possible and are included within the scope of this disclosure. The inventors note that while another pin, such as a cotter pin may be used, such deformable cotter pins are less preferred because they are not re-useable once deformed (i.e. after one use when an operator desires to remove the tires 11 for storage of the cart system 101 in a small space, like a vehicle 200 illustrated in FIG. 2).

The system 101 may further include a base protector 13 that may comprise a knurled sleeve or finned tube cover that encloses the bottom frame member (under 13). As understood by one of ordinary skill in the art, knurling is a manufacturing process, typically conducted on a lathe, whereby a pattern of straight, angled or crossed lines is rolled into a material.

Also visible in FIG. 1A are fasteners 7 which couple cross-bars 21 (not visible in FIG. 1A, but see FIG. 1B). The fasteners 7 may comprise screws, but other fasteners are possible. Other fasteners include, but are not limited to, welds, rivets, nails, adhesives, and the like.

The beach cart system 101 may further comprise a coupler 12. The coupler 12 may fasten to and maintain the telescoping handle 2 adjacent to the frame members 3 which form the payload area 17, when the beach cart system 101 is in a folded or non-operational state (See FIGS. 19A-19C for the folding states).

According to one exemplary embodiment, the coupler 12 may comprise a strap with hook-an-loop fasteners at its ends. However, other couplers are possible and are included within the scope of this disclosure. Other couplers include, but are not limited to, wires, metal hooks, metal clasps and the like. While only a single coupler 12 is shown on one member of the payload area 17, a second coupler 12 (not shown) could be employed on a mirroring side of the payload area 17 as understood by one of ordinary skill in the art.

Referring now to FIG. 1B, this figure illustrates an exemplary schematic of the beach cart system 101 and highlights the dimensions of the detachable/removable & inflatable tires 10 which are coupled to axle 40 via wheels 9 and pins 11 (See FIG. 1C). In this exemplary schematic, the inflatable tires 10 are illustrated in an inflated, yet unloaded state. That is, FIG. 1B illustrates the inflatable tires 10 at a proper inflation and shows their approximate geometry as if the beach cart system 101 was in an unloaded state. In an unloaded state, only the weight of the axle 40, tubular frame members 3, and cross-bars 21, and other elements forming system 101 would be the load/load forces transferred to the tires 10. In an unloaded state, the payload area 17 or bag 4 do not carry or support any extraneous elements (i.e. payload, like, a beach umbrella, beach ball(s), and/or cooler, etc.).

The inventors have discovered that the proper inflation for the inflatable tires is between about 2.0 and about 3.0 pounds per square inch (psi). According to one of the inventive aspects of this system 101, achieving this proper inflation range can be very difficult since most tire pressure gauges are not designed for providing readings within such a relatively low pressure range. Most tire pressure gauges as of this writing, such as pressure gauges for automobile tires and/or bicycle tires, may have a margin of error between at least 1.0 and 3.0 psi.

Thus, achieving proper inflation for the tires 10 to traverse efficiently over soft sand environments may be very challenging for the user. Over inflating the tires 10, such as in the range of 3.5 psi and above may cause the tires not to roll over the soft sand efficiently and to dig into sand rather than rolling over it as discovered by the inventors. What makes proper inflation of the inflatable tires 10 even more challenging is that the tires 10 can be inflated between 5.0 and 6.0 psi with or without necessarily damaging or permanently deforming the tire. Tires 10 inflated between 5.0 and 6.0 psi will not roll on top of soft sand environments as discovered by the inventors. Thus, the tires 10 must be inflated between about 2.0 and about 3.0 psi in order to efficiently traverse (i.e. roll most easily over) soft sand environments.

Referring again to FIG. 1B, the diameter (Dt1) of each tire 10, when at the proper inflation range between about 2.0 and about 3.0 psi and in an unloaded state, is about 13.0 inches. The width of each tire (Wt) when at the proper inflation and in an unloaded state (i.e. each tire 10 only supporting the elements of system 101) is between about 5.8 and about 6.2 inches, and preferably about 6.0 inches.

Meanwhile, the width of the payload (Wp) area 17, which is dependent generally on the tire width (Wt) (at proper inflation) and width of the axle 40 (W40), is between about 12.0 inches and about 18.0 inches, and preferably at about 15.0 inches. The payload area 17 is generally defined by its width (Wp) and its length (Lp). The length of the payload area (Lp) is generally between about 16.0 inches and 24.0 inches, and is preferably at about 21.0 inches. The width of the axle 40 (W40) is generally between about 28.0 inches and about 35.0 inches, and preferably is at about 30.5 inches. But other dimensions outside of these ranges are possible and are included within the scope of this disclosure as understood by one of ordinary skill in the art.

Referring now to FIG. 1C, this figure illustrates an exemplary force diagram that includes a side view of the inflatable tires at the proper pressure (i.e. between about 2.0 psi and about 3.0 psi) and under a load, represented by three payload forces (PLFs) PLF1, PLF2, & PL3. The three payload forces (PLFs) may be caused by the weight (mass× gravity) of the system 101 in an unloaded (i.e. empty payload) state. The payload forces (PLFs) may also be caused by the weight of the system 101 in addition to an actual payload (i.e. items/objects held in place on top of the payload area 17, such as, but not limited to, beach gear, including beach umbrellas, beach chairs, sports equipment (i.e. balls, throwing discs, sand digging toys, etc.).

According to one exemplary embodiment, a maximum payload weight may comprise a magnitude of about 165.0 pounds (where total weight of cart system 101 with maximum payload weight is 165.0+18.0=183.0 lbs.). However, other magnitudes greater or smaller are possible and are included within the scope of this disclosure. FIG. 1C also illustrates that the beach cart system 101 is designed to move through/traverse though standard doorway widths. As of this writing, standard doorway widths in the United States are about 36.0 inches as understood by one of ordinary skill in the art.

What the inventors have discovered is that the contact width (CW) on soft sand for each tire 10 (having a diameter of 13.0 inches with weight of only the system 101 which is about 18.0 lbs.) at the proper inflation (i.e. between about 2.0 psi and 3.0 psi), is between about 3.8 inches and 4.2 inches, and preferably at about 4.0 inches on a soft sand surface. The inflatable tires 10 with these parameters will rotate efficiently over soft sand.

For a loaded system 101, that includes its own weight (i.e. approximately 18.0 lbs. for the system 101 alone) and a 150.0 lb payload, a first payload force (PLF1) is generated which is distributed among the axle 40 as two payload forces (PLF2 & PLF3). The tires 10 with a proper inflation (i.e. between about 2.0 psi and about 3.0 psi) will generally have a contact width (CW) between about 6.8 inches and 7.2 inches, and preferably about 7.0 inches in magnitude on a soft sand surface. The inflatable tires 10 with these parameters will rotate efficiently over soft sand.

Table 1 listed below summarizes this data and parameters discovered by the inventors:

TABLE 1

Parameters for System 101 Yielding Optimal Contact Width (CW) for Tires 10

| Inflation pressure | Tire Diameter 13.0 inches (as sold) | Load | Length Payload (Lp) | Width Axle 40 (W40) | Payload Width (Wp) | Circum. (C) | Contact Width (CW) |
|---|---|---|---|---|---|---|---|
| 2.0-3.0 psi | 13.00 inches | 18.0 lbs. | 21.0 inches | 30.5 inches | 15.0 inches | 42.0 inches | 3.8-4.2 inches |
| 2.0-3.0 psi | 10.25 inches | 158.0 lbs. | 21.0 inches | 30.5 inches | 15.0 inches | 42.0 inches | 6.8-7.2 inches |

FOR A MAXIMUM AXLE WIDTH (W40) OF 36.0 inches: The ratio of the minimum contact width (CW) for each inflatable tire 10 to maximum axle width (W40) for an unloaded cart system 101 (weight of system 101 itself) expressed as a decimal is about 0.110 (i.e. 3.8 inches for CW to 36.0 inches for W40, and where each tire has a maximum listed diameter of 13.0 inches, and a pressure range between 2.0 and 3.0 psi, and system weight of 18.0 lbs.). This means the ratio of the minimum contact width (CW) for each inflatable tire 10 to maximum axle width (W40) for a loaded cart system 101 expressed as a decimal is about 0.200 (i.e. 7.2 inches for CW to 36.0 inches for W40, and where each tire has a maximum listed diameter of 13.0 inches, and a pressure range between 2.0 and 3.0 psi, a system weight of 18.0 lbs. with a load of 150.0 lbs.).

FOR A MAXIMUM AXLE WIDTH (W40) OF 30.5 inches: The ratio of the minimum contact width (CW) for each inflatable tire 10 to maximum axle width (W40) for an unloaded cart system 101 (weight of system 101 itself) expressed as a decimal is about 0.125 (i.e. 3.8 inches for CW to 30.5 inches for W40, and where each tire has a maximum listed diameter of 13.0 inches, and a pressure range between 2.0 and 3.0 psi, and system weight of 18.0 lbs.). This means the ratio of the minimum contact width (CW) for each inflatable tire 10 to maximum axle width (W40) for a loaded cart system 101 expressed as a decimal is about 0.240 (i.e. 7.2 inches for CW to 30.5 inches for W40, and where each tire has a maximum listed diameter of 13.0 inches, and a pressure range between 2.0 and 3.0 psi, a system weight of 18.0 lbs. with a load of 150.0 lbs.).

The inventors have also tested the system 101 with empty and loaded payloads and inflating the tires 10 outside the optimal pressure range. When the tires 10 are inflated outside the optimal pressure range of between about 2.0 and about 3.0 psi, the tires do not rotate properly over soft sand environments. Table 2 listed below provides the data for the tire pressure range and contact widths which do not work (i.e. tires do not rotate efficiently or properly over soft sand environments).

TABLE 2

Tire Pressure Range and Contact Widths (CWs) which do not work

| Inflation pressure | Tire Diameter 13.0 inches (as sold) | Load | Length Payload (Lp) | Width Axle 40 (W40) | Payload Width (Wp) | Circum. (C) | Contact Width (CW) |
|---|---|---|---|---|---|---|---|
| 4.0-5.0 psi | 13.5 inches | 18.0 lbs. | 21.0 inches | 30.5 inches | 15.0 inches | 44.0 inches | 3.0 inches |
| 4.0-5.0 psi | 11.0 inches | 158.0 lbs. | 21.0 inches | 30.5 inches | 15.0 inches | 44.0 inches | 5.5 inches |

Referring now to FIG. 1D, this figure illustrates a side view of an inflatable tire 10 inflated at the optimal pressure range and being circumscribed by a tire inflation tool 55. The tire inflation tool 55 is provided with a "printed" wavy line 88 to distinguish it from the surface of the inflated tire 10. Instead of a "printed" wavy line 88, alphanumeric text (see FIG. 3O), like "Mybeachart.com" and other like text can be printed on the tool 55.

The inventors have discovered that the circumference (C1) of the inflatable tire 10 at the optimal pressure range is one preferred way of measuring tire pressure. The tire inflation tool 55, providing the circumference of the tire 11 at the optimal pressure range, is preferred because, as explained above, most conventional tire pressure gauges are not calibrated to measure very low pressure ranges (i.e. a pressure range between 2.0 and 3.0 psi). Thus, the inventors provide the tire inflation tool 55 as part of the system 101, as part of a kit that is sold for assembling the final system 101 as illustrated in FIG. 1A.

Referring now to FIG. 1E, this figure illustrates the tire inflation tool 55 separate and independent of the inflatable tire 10 compared to FIG. 1D. As noted previously, the inventors have discovered that the tire inflation tool 55 providing a circumference of the tire 10 at the optimal pressure solves the potential problem of over-inflation of the inflatable tire 10. As listed in TABLE 1 provided above, the optimal length (i.e. circumference—C1) is about 42.0 inches.

Figure 1F:
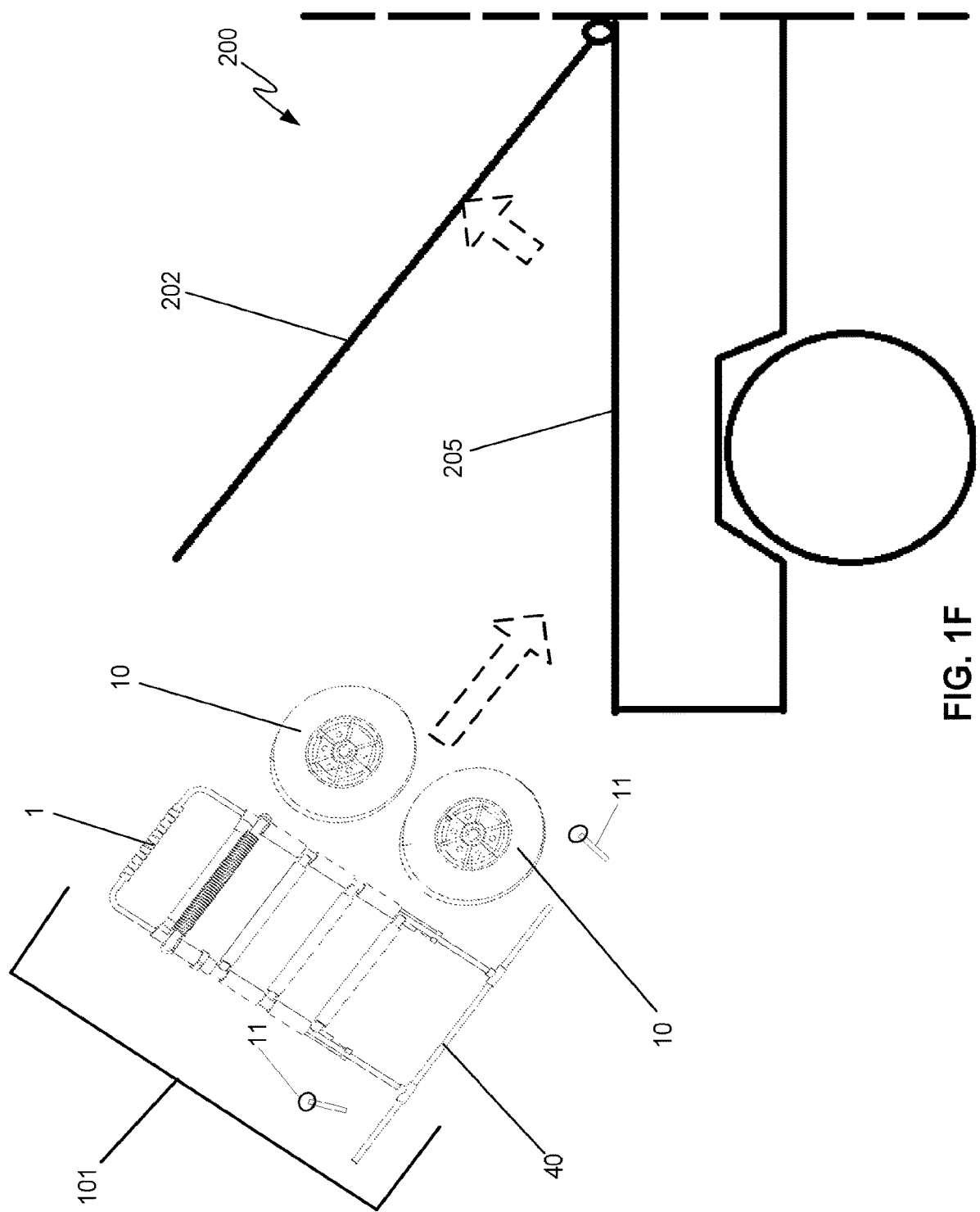
FIG. 1F illustrates how the beach cart system is portable and can be stowed away in a storage area of a vehicle.

Referring now to FIG. 1F, this figure illustrates how the beach cart system 101 is portable and can be stowed away in a storage area of a vehicle 200. Specifically, the inflatable tires 10 may be easily removed from the axle 40 by removing lynch pins 11 from the axle 40. Further, with hinges 8 (See FIG. 1A), the telescoping handle 2 may fold onto the payload area 17 (See FIGS. 19A-19C).

Figure 2:
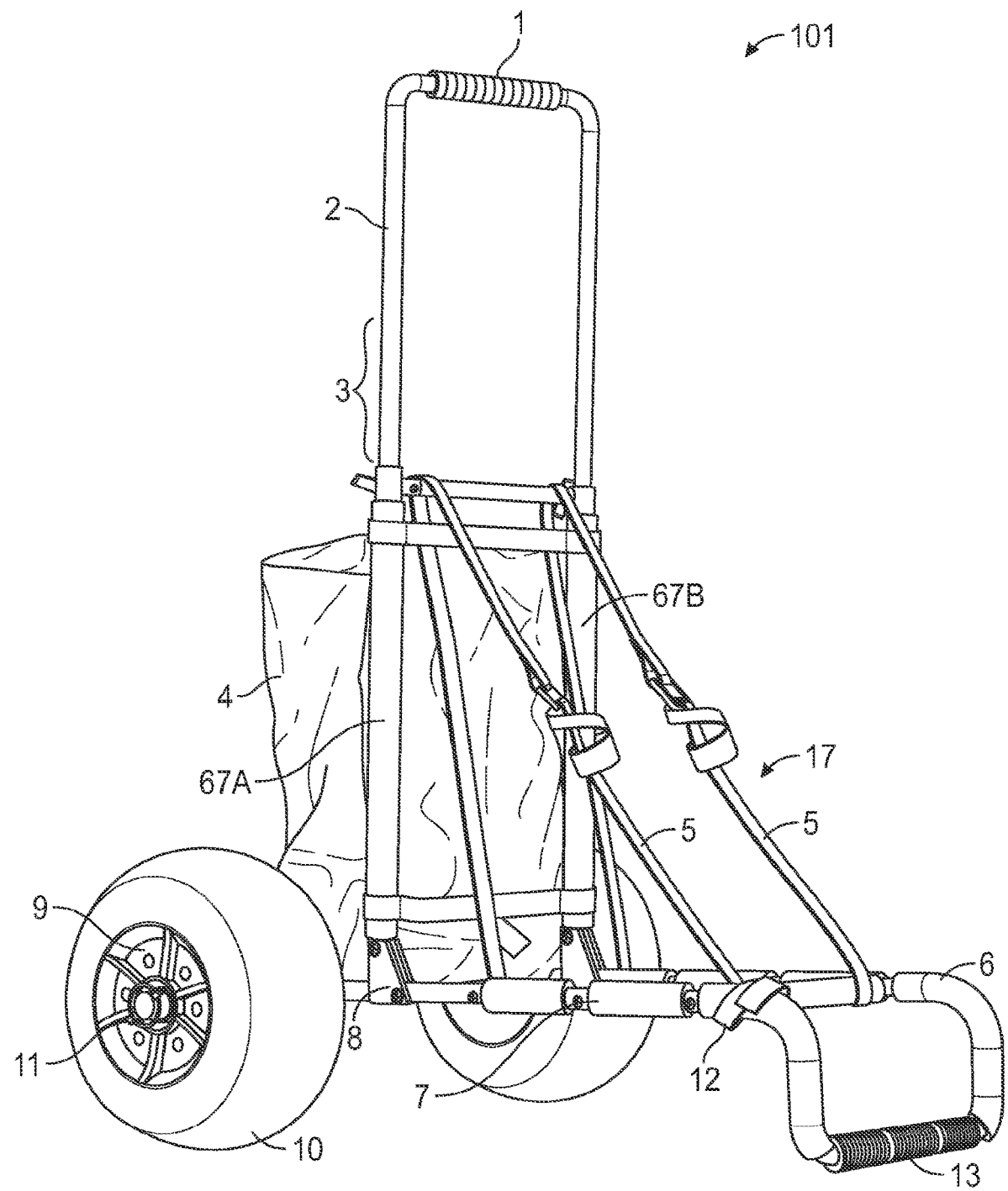
FIG. 2 illustrates a side perspective view of the cart system with the telescoping U-shaped handle in a fully extended state compared to the contracted state illustrated in FIG. 1A.

Referring now to FIG. 2, this figure illustrates a side perspective view of the cart system 101 with the telescoping U-shaped handle 2 in a fully extended state compared to the contracted state illustrated in FIG. 1A. As noted previously, the "U"-shaped handle 2 may have one side of its three sides covered with padding to form the padded grip 1 as described above. The grip 1 makes it easier on operator's hands to pull the cart system 101, especially when it has heavy loads, like a 150.0 pound load. The grip 1 comprising a padding material, compared to bare metal of the tubular frame members 3, is also heat resistant when the system 101 is exposed to high or low temperatures. This means that the grip 1 will usually not be too hot or too cold to touch even when the cart system 101 is exposed to extreme high or low temperatures.

The U-shaped handle 2 may be made of a single hollow tubular frame member 3 which has a first diameter. Each end of the U-shaped handle 2 may have a sliding fit and may telescope/slide within hollow telescoping support members 67A, 67B. That is, the hollow telescoping support members 67A, 67B may have a second diameter greater than the first diameter, such that each end of the U-shaped handle 2 may slide inside each hollow telescoping support member 67. How the U-shaped handle 2 is locked at a particular height relative to the telescoping support members 67 will be described below in connection with FIGS. 6C-6D and FIGS. 10-12.

Figure 19A:
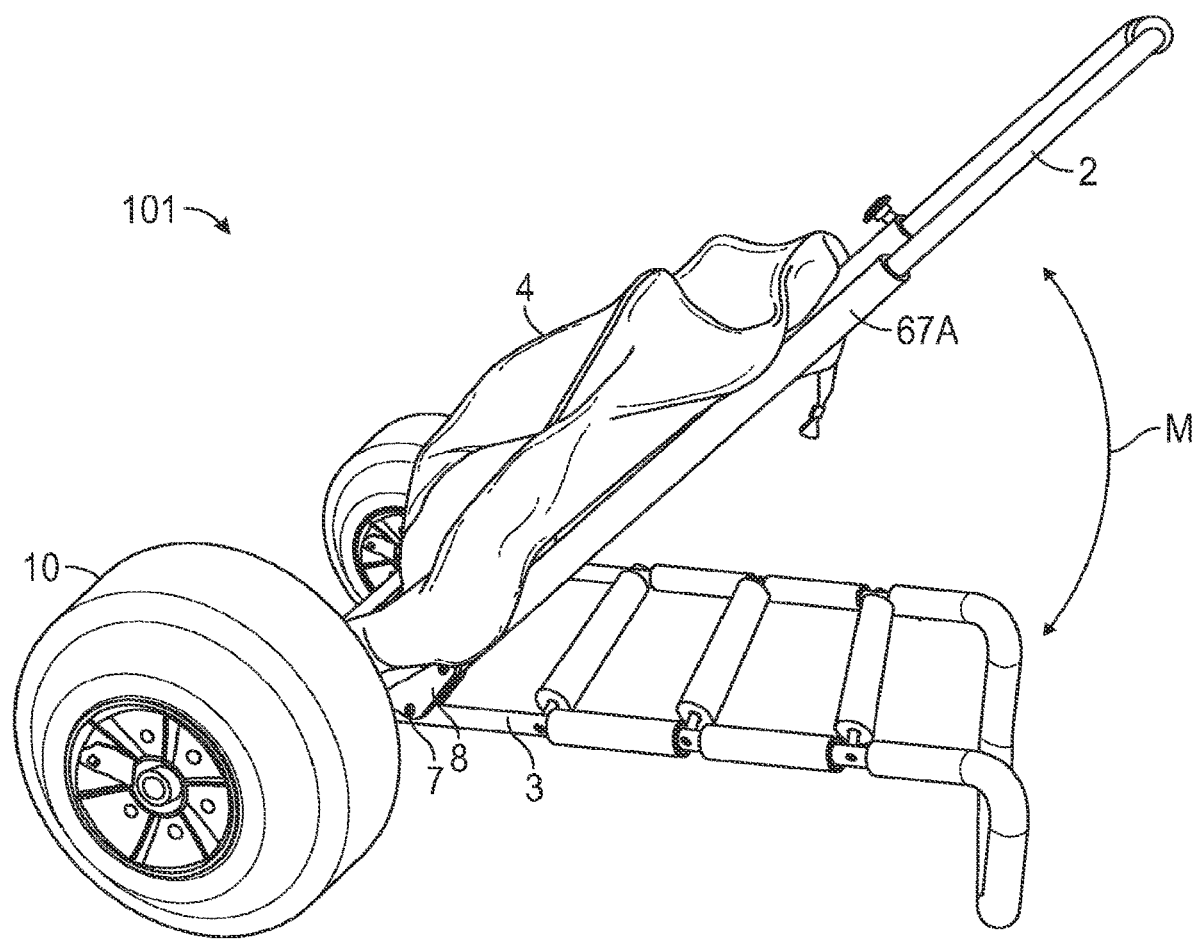
FIG. 19A illustrates the cart system in a partially collapsed state where the telescopic support member may pivot or rotate around frame member by the hinge, and specifically the lower fastener of the hinge.
Figure 19C:
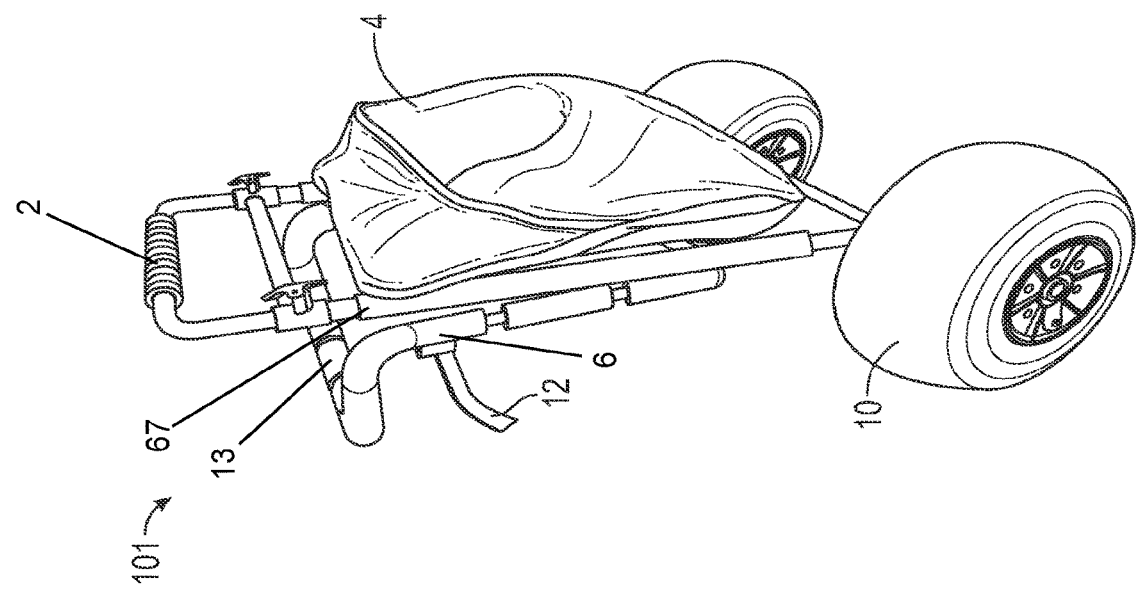
FIG. 19C illustrates a second side perspective view of the cart system in a collapsed state and which is a mirror-opposite view relative to the view of FIG. 19B.
Figure 19B:
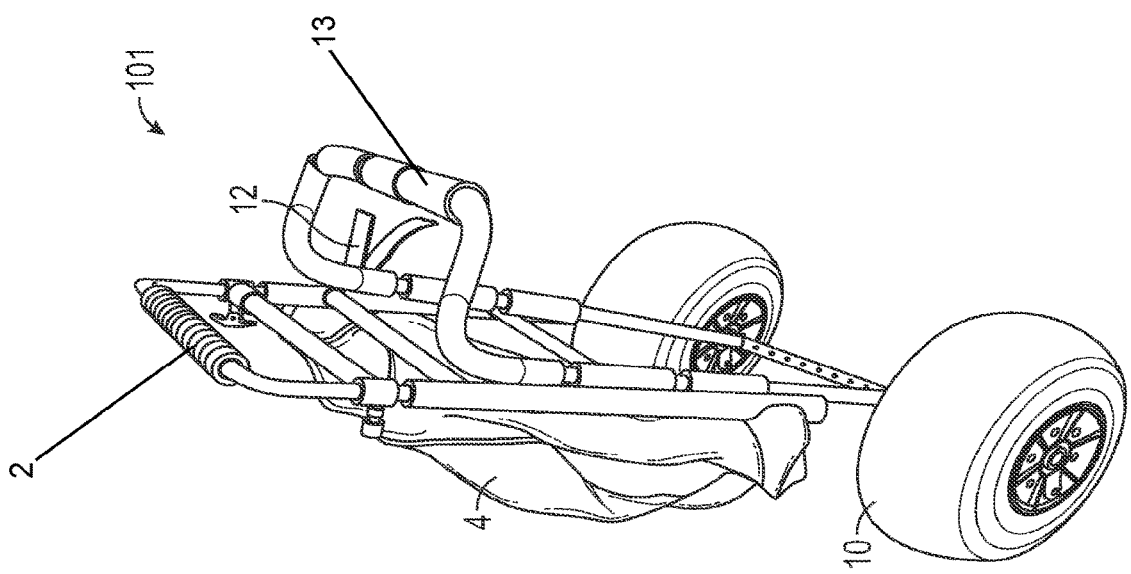
FIG. 19B illustrates a first side perspective view of the cart system in a collapsed state.

Each hollow telescoping support member 67 may be coupled to frame members 3 forming the payload area 17 by hinges 8. The hinges 8 allow the U-shaped handle 2 and hollow telescoping support members 67 to fold and move towards one another as illustrated in FIGS. 19A-19C.

Figure 3:
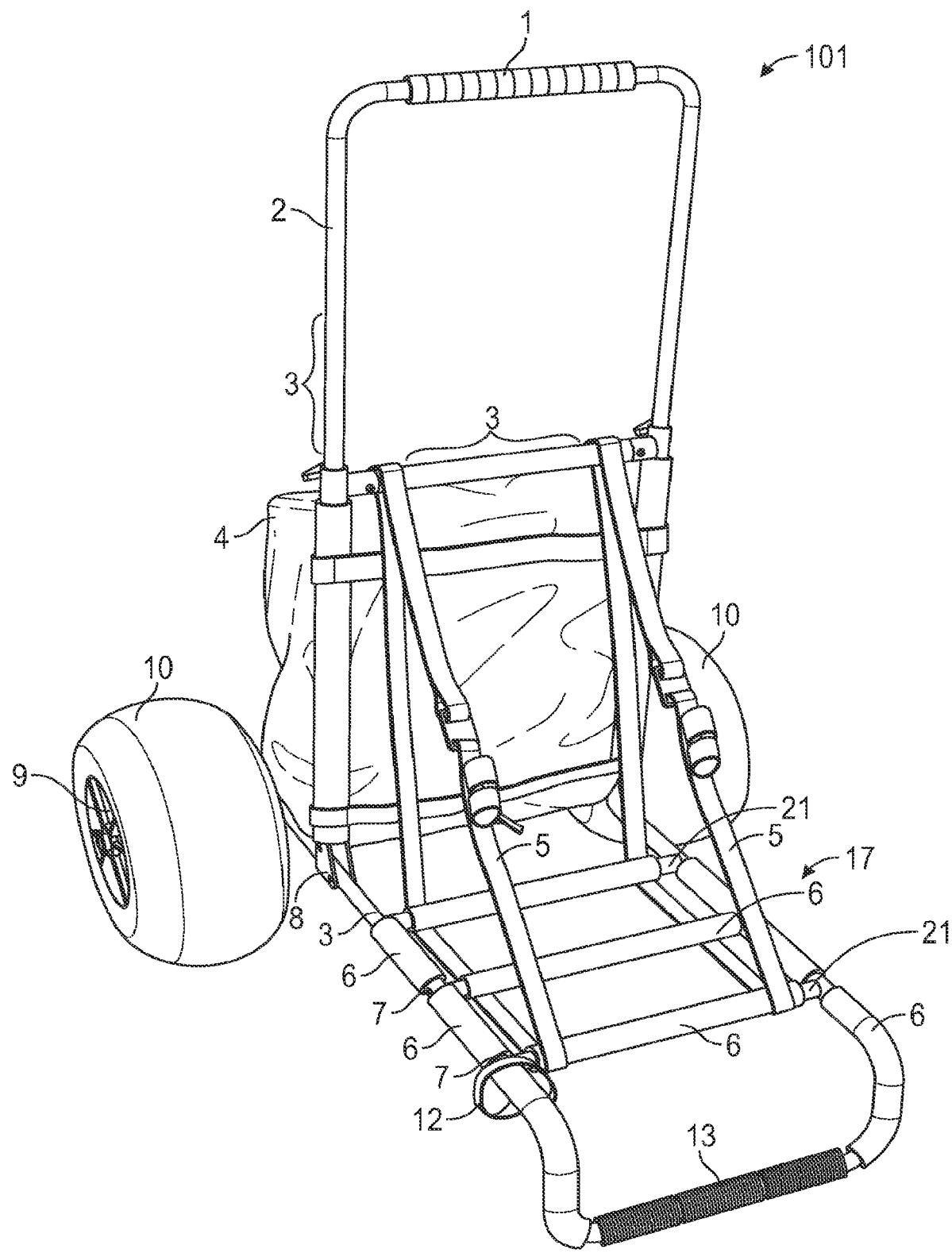
FIG. 3 is a side, perspective view of the cart system that shows the frame members and cross-bars forming the payload area.

Referring now to FIG. 3, this figure is a side perspective view of the cart system 101 that shows the frame members 3 and cross-bars 21 forming the payload area 17. The cross-bars 21 forming the payload area may have padding 6 that encloses the tubular members 3 and cross-bars 21. This padding 6 may provide an increased coefficient of friction compared to bare metal, like that of the tubular members. This increased coefficient of friction from the padding 6 may help and/or prevent objects (i.e. payload) from sliding off the members 3 and cross-bars 21 during use of the cart system 101 when positioned in the payload area 17 and secured by straps 5.

The padding 6 may be skid resistant so cargo rests on it and does not slide off when rolling over divots, such as in soft sand environments. The padding 6 may also protect cargo from being scratched by the tubular members 3 (i.e metal cargo on the metal tubular members 3, etc.).

Figure 4:
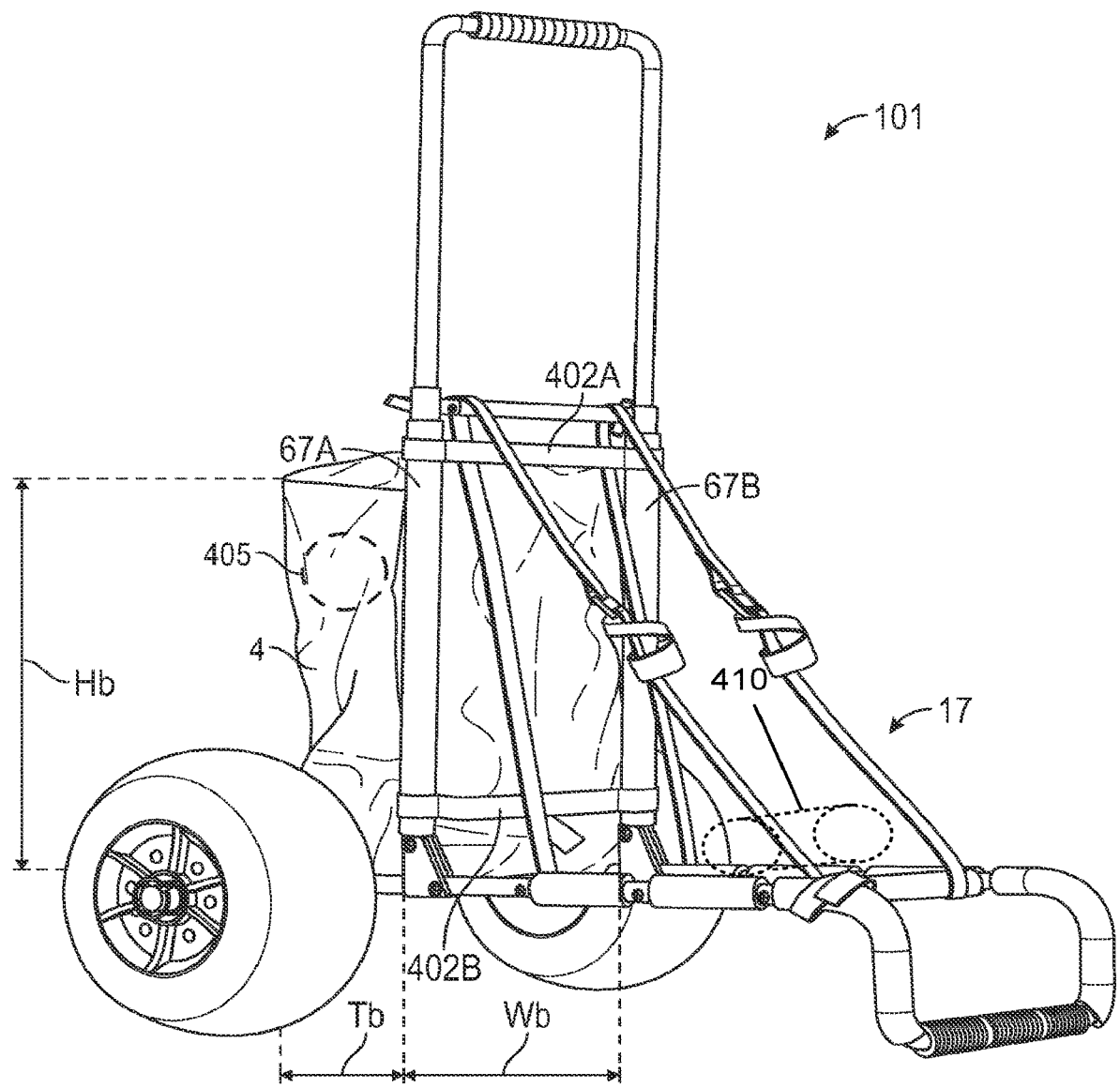
FIG. 4 illustrates another side perspective view of the cart system with the handle in its full extended state and the bag containing or enclosing a cargo item.

Referring now to FIG. 4, this figure illustrates another side perspective view of the cart system 101 with the handle 2 in its full extended state and the bag 4 containing or enclosing a first cargo item 405. In this figure, the first cargo item 405 may comprise a circular object such as a ball, and more particularly, a beach ball. The cargo item 405 is illustrated with dashed lines to indicate that the cargo item 405 may be visible to the operator since the bag 4 may be made from transparent material, such as a mesh-like material. The cargo item 405 may comprise other types of cargo, which may include, but are not limited to, towels, toys, tanning lotion, sundries, etc.

According to one exemplary embodiment, the bag 4 may comprise a mesh bag with the exemplary dimensions of: 15" [Wb]×21" [Hb]×6" [Tb]. Other dimensions for this bag 4 are possible and are included within the scope of this disclosure. The bag 4 may comprise zippered openings (not shown in FIG. 4, but see FIG. 7) on three sides. The mesh fabric is strong enough to hold cargo 405 but liquid permeable so that water and sand will flow therethrough. The bag 4 may further comprise two straps 402A, 402B to connect to the telescoping support members 67A, 67B. Each strap 402 may connect to itself with a buckle 902 (not visible in FIG. 4, but see FIG. 9 described below).

The cargo area 17 may be further loaded with a second cargo item 410 illustrated with a dashed cylinder. The second cargo item 410 may comprise any one or a number of objects described previously. Exemplary objects include, but are not limited to, beach gear, including beach umbrellas, coolers/ice chests, beach chairs, sports equipment (i.e. balls, throwing discs, racquets), sand digging toys, etc.

Figure 5:
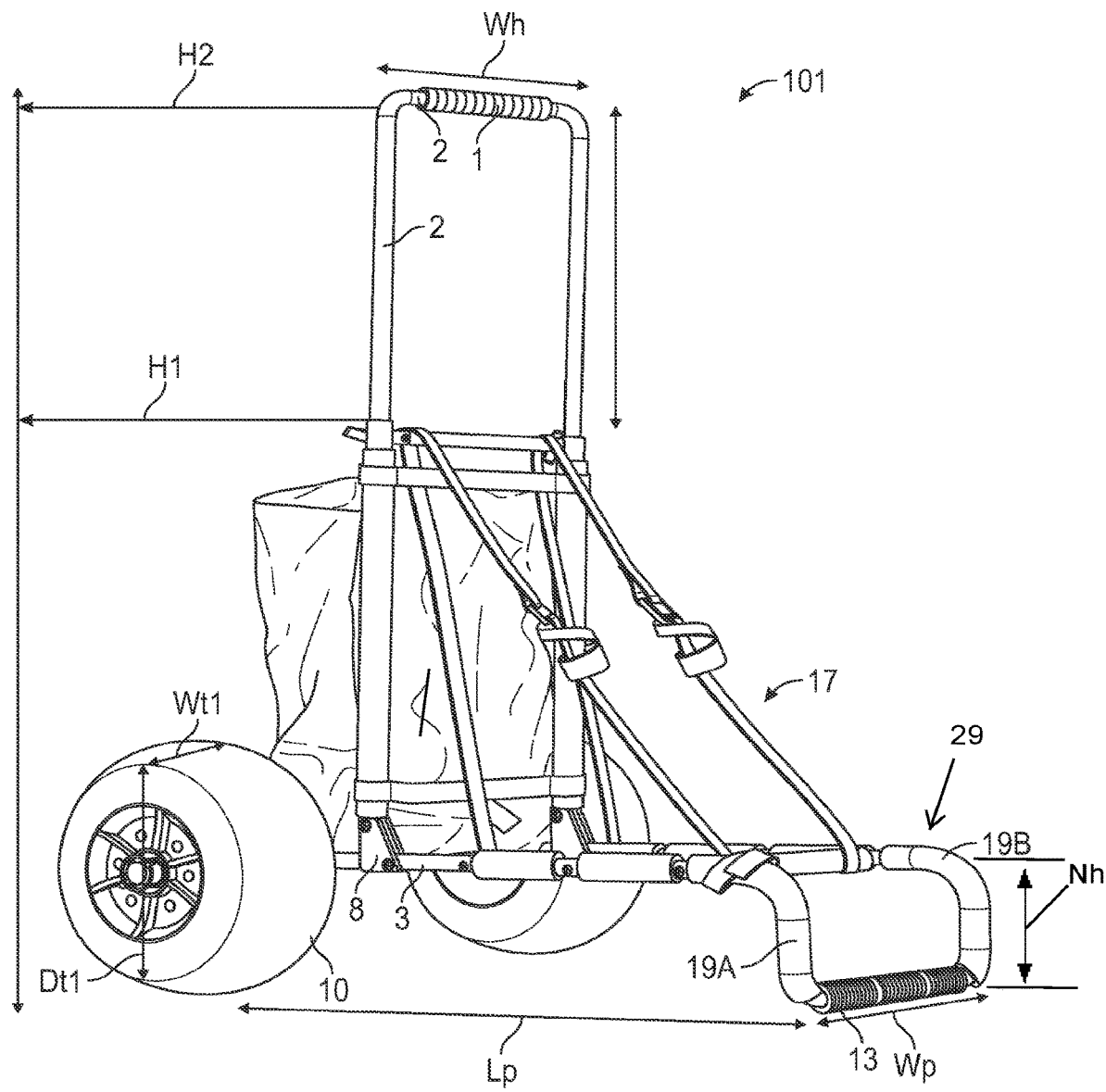
FIG. 5 illustrates another side perspective view of the cart system according to one exemplary embodiment and where the handle remains in a fully extended state.

Referring now to FIG. 5, this figure illustrates another side perspective view of the cart system 101 according to one exemplary embodiment and where the handle 2 remains in a fully extended state. In this fully extended state shown in FIG. 5, the height H2 of handle 2, and particularly the padded grip 1, is about 46.0 inches (which also includes the height provided by the tires 11).

In the contracted state illustrated in FIG. 1A, and the height H1 of handle 2 shown in FIG. 5, and particularly the padded grip 1, is about 32.0 inches (which also includes the height provided by the tires 11). Other heights H for the handle 2 are possible and are included within the scope of this disclosure. That is, heights shorter or taller than disclosed are possible and are included within the scope of this description.

As noted previously, the payload area 17 may be defined by a length (Lp) dimension and a width dimension (Wp). The length Lp corresponds with the length of the tubular frame member 3 which extends in a horizontal manner as shown in FIG. 5 from the hinge 8. The width (Wp) of the payload area 17 is defined by the cross-bars 21 (not seen in FIG. 5, but see FIGS. 1B & 3) as well as the base protector 13.

As described above in connection with FIG. 1B, the width of the payload (Wp) area 17 (as also seen in FIG. 5) is between about 12.0 inches and about 18.0 inches, and preferably about 15.0 inches. The length of the payload area (Lp) is generally between about 16.0 inches and 24.0 inches, and is preferably about 21.0 inches. But other dimensions outside of these ranges are possible and are included within the scope of this disclosure as understood by one of ordinary skill in the art.

The width of the handle 2 generally corresponds and is substantially equal to the payload width (Wp). The grip 1 comprising a padded material generally has a width which is less than that of the handle 2 and the payload width Wp. According to one exemplary embodiment, the width of the grip 1 is about 8.5 inches. However, other magnitudes larger or smaller for the grip 1 are possible and are included within the scope of this disclosure.

Also illustrated in FIG. 5 is a nose region 29 defined by two curved members 19A, 19B and the base protector 13. Each curved member 19 may define the nose height (Nh). The nose height (Nh) is generally to about ½ the height of the tire diameter (Dt1). So according to one exemplary embodiment, the nose height (Nh) is about 6.5 inches when the tire diameter is about 13.0 inches. It is noted that the nose height (Nh) is also generally equal to the height of the axle 40 relative to the ground.

Figure 6:
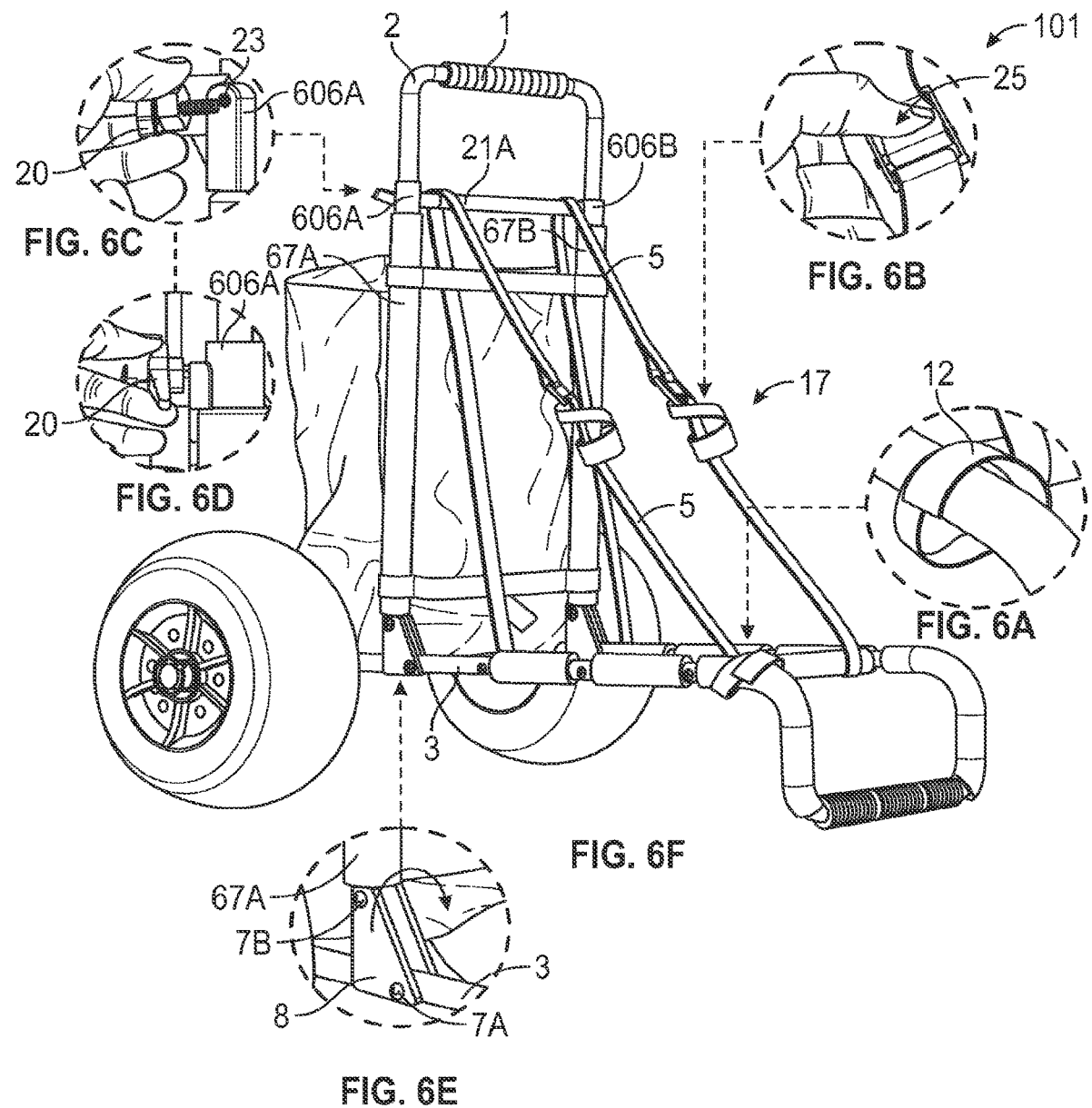
FIG. 6A illustrates a side perspective view of the coupler that keeps the cart system in a folded state when the handle and frame members of the cargo area are folded into each other.
FIG. 6B illustrates an enlarged view of a payload strap and its corresponding strap fastener.
FIG. 6C illustrates an enlarged view of telescoping locking mechanisms (in an unmated state) that lock handle at a particular distance relative to hollow telescoping support members.
FIG. 6D illustrates an enlarged view of telescoping locking mechanisms (similar to FIG. 6C but now in a mated state) that lock handle at a particular distance relative to hollow telescoping support members.
FIG. 6E illustrates an enlarged view of the hinges which couple telescoping support members to the lower frame members of the cargo payload area.
FIG. 6F illustrates a side perspective view of the cart system and provides an overview of the parts illustrated in enlarged views 6A-6E.

Referring now to FIG. 6A, this figure illustrates a side perspective view of the coupler 12 that keeps the cart system in a folded state when the handle 2 and frame members 3 of the cargo area 17 are folded into each other. As noted above, the coupler 12 may fasten to and maintain the telescoping handle 2 adjacent to the frame members 3 which form the payload area 17, when the beach cart system 101 is in a folded or non-operational state (See FIGS. 19A-19C for the folding states). The coupler 12 may comprise a strap having hook-and-loop fasteners.

Referring now to FIG. 6B, this figure illustrates an enlarged view of a payload strap 5 and its corresponding strap fastener 25. According to one exemplary embodiment, the strap fastener 25 may comprise a cam buckle. However, other strap fasteners 25 are possible and may be employed without departing from the scope of this disclosure as understood by one of ordinary skill in the art.

Each strap 5 may have a length of about 10.0 feet. Each strap 5 may be made from nylon. However, other materials and sizes are possible for the straps 5 and are included within the scope of this disclosure. The straps 5 and strap fasteners 25 may be used to secure cargo 410 in the payload area 17 of the cart system 101. These straps 5 are improvements over bungee type straps because the straps 5 may eliminate any slack so that cargo in the payload area 17 will remain securely in place while the cart system 101 traverses bumpy environments, like soft sand.

Referring now to FIG. 6C, this figure illustrates an enlarged view of telescoping locking mechanisms 20 (in an unmated state) that lock handle 2 at a particular distance relative to hollow telescoping support members 67A, 67B. The telescoping locking mechanisms 20 may comprise threaded screws with plastic handles where the screws mate with threaded apertures 23 of a three-way coupler 606A. The three-way coupler 606A joins the handle 2 with a cross-bar 21A and the telescoping support member 67A. The threaded screws with handles 20 may be screwed and un-screwed by a human operator.

Referring now to FIG. 6D, this figure illustrates an enlarged view of telescoping locking mechanisms 20 (similar to FIG. 6C but now in a mated state) that lock handle 2 at a particular distance relative to hollow telescoping support members 67A, 67B. Other locking mechanisms 20 besides threaded screws with plastic handles are possible and are included within the scope of this disclosure. For example, other locking mechanisms 20 could include a push-button in handle 2 and a plurality of apertures or holes which are provided in the telescoping support members 67A, 67B.

Referring now to FIG. 6E, this figure illustrates an enlarged view of the hinges 8 which couple telescoping support members 67A, 67B to the lower frame members 3 of the cargo payload area 17. The hinges 8 allow the telescoping support members 67A, 67B to rotate around a pivot point, which is a first fastener 7A shown in FIG. 6E. The first fastener 7A couples the hinge 8 to frame member 3.

Meanwhile, a second fastener 7B couples the telescoping support member 67A to the hinge 8. Directional arrow 602 demonstrates how the telescoping support member 67A and second fastener 7B rotate in a counter-clockwise direction around and relative to fastener 7A, which is the pivot point for the hinge 8 as mentioned above.

Referring now to FIG. 6F, this figure illustrates a side perspective view of the cart system 101 and provides an overview of the parts illustrated in enlarged views 6A-6E described previously. The telescoping handle 2 and hinges 8 in addition to the removable tires 11 and wheels 9 provide a robust cart system 101 which may expand in its operational state to support numerous objects. In its non-operational or storage state, the cart system 101 may become very compact so that it may fit into tight or small storage areas, such as in a vehicle 200 as illustrated in FIG. 1F described previously.

Figure 7:
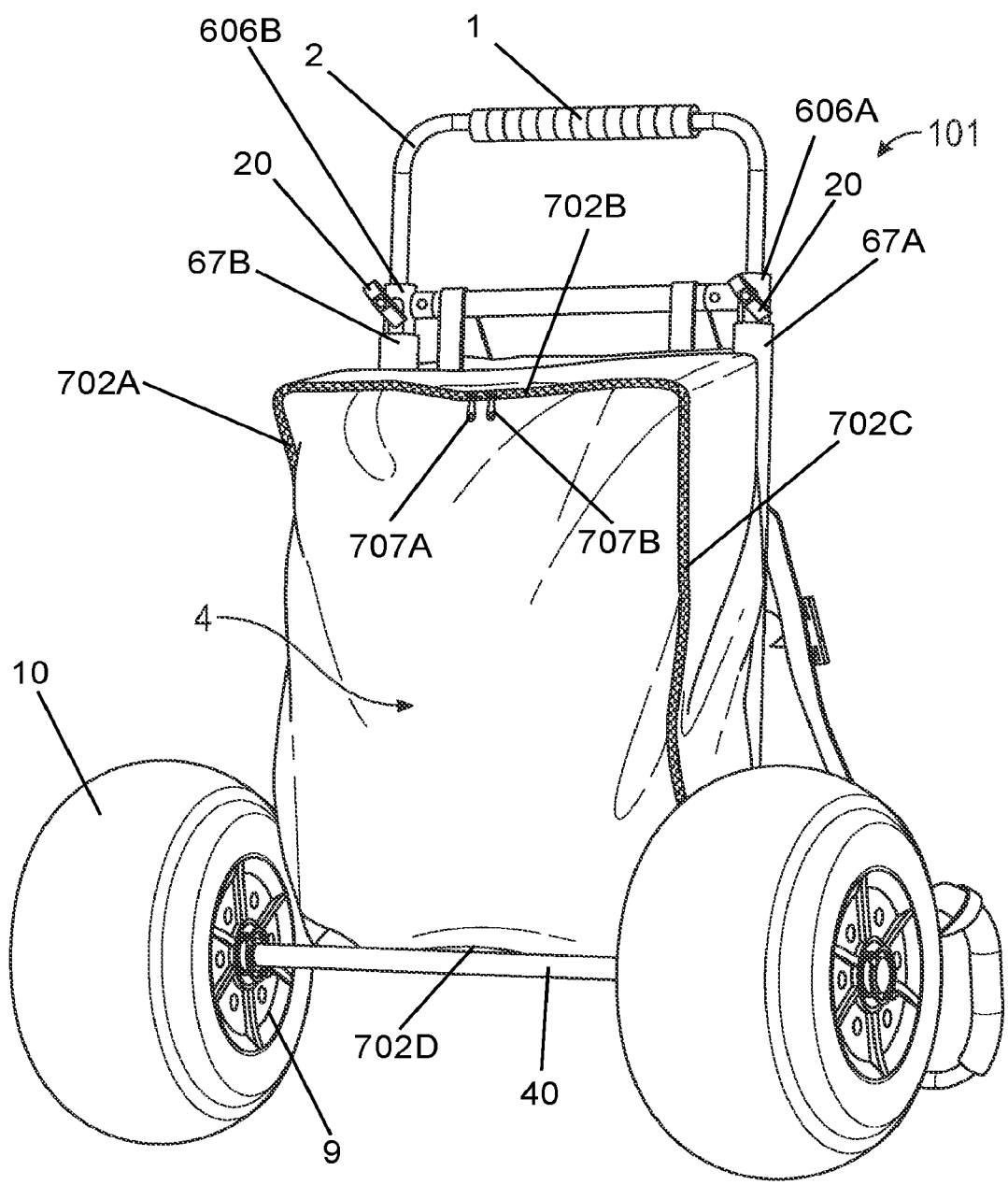
FIG. 7 illustrates a rear perspective view of the cart system and provides additional details for the mesh bag.

Referring now to FIG. 7, this figure illustrates a rear perspective view of the cart system 101 and provides additional details for the mesh bag 4. As noted previously, the bag 4 may comprise zippered openings on three sides. Specifically, see first side 702A, second side 702B, and third side 702C of the bag 4. Each of these three sides 702A, 702B, & 702C may have a zippered portion fastened together by one of two zippers 707A, 707B. Meanwhile, the fourth side 702D does not have any zippered portion so that the three sides 702A-702C define a flap for the bag 4 which opens easily to receive and allow for removal of cargo items 405.

The number of zippers 707 and sides 702 with openings may be increased or decreased without departing from this disclosure. Further, other fasteners besides zippers 707 may be employed. For example, snaps, strings, etc. may be employed as fasteners 707 as understood by one of ordinary skill in the art to fasten each of the three sides 702. As mentioned above, the mesh fabric of the bag 4 is strong enough to hold cargo 405 but liquid permeable so that water and sand will flow therethrough.

Figure 8:
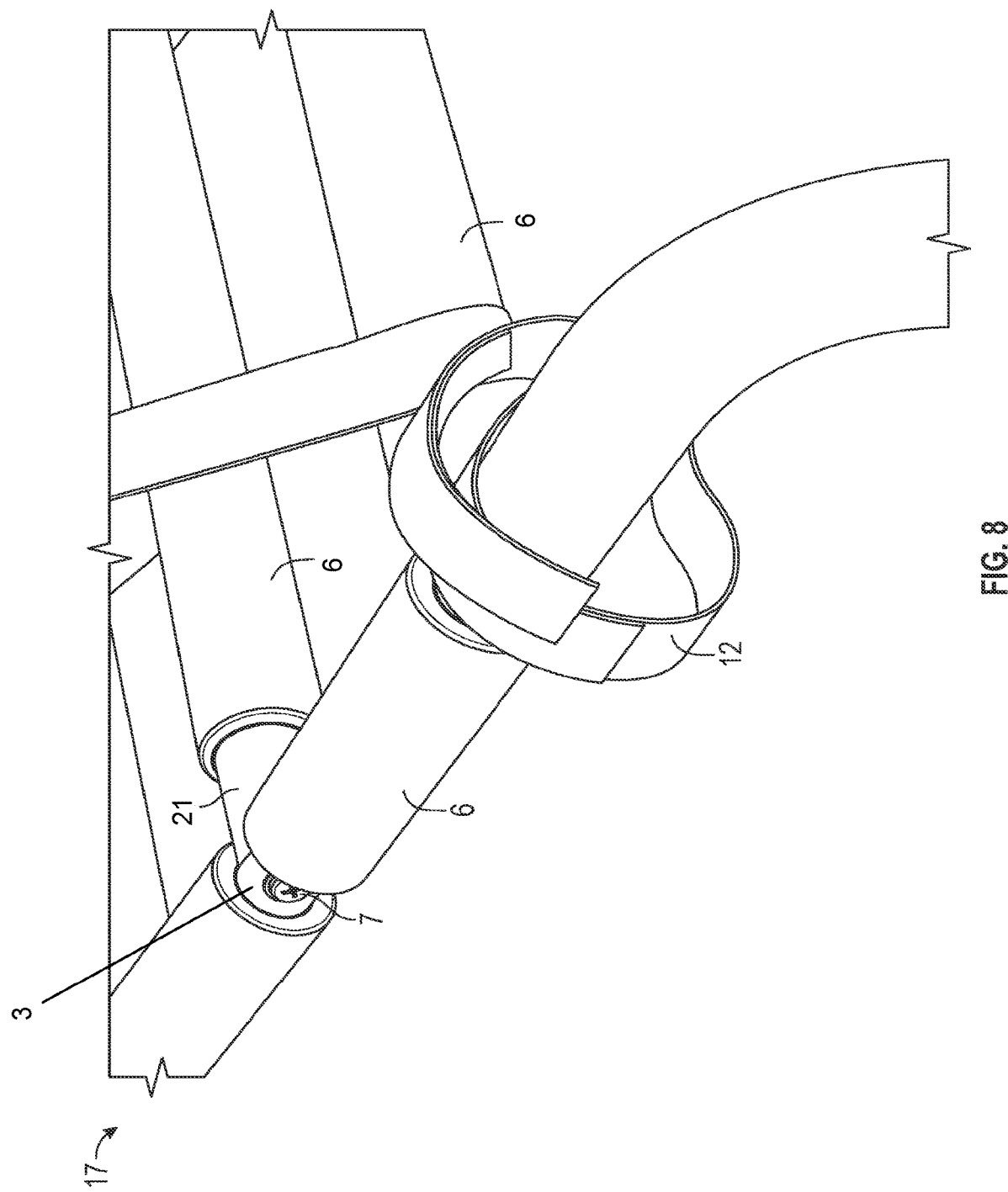
FIG. 8 illustrates an enlarged view of the cargo area and provides details for the frame members and cross-bars.

Referring now to FIG. 8, this figure illustrates an enlarged view of the cargo area 17 and provides details for the frame members 3 and cross-bars 21. As illustrated, frame members 3 as well as the cross-bars 21 may be surrounded or encased with padding 6. FIG. 8 also shows an enlarged view of coupler 12, which is used to couple handle 2 to the frame member 3 when the cart system 101 is in a storage position (see FIGS. 19B-19C for the storage position).

Figure 9:
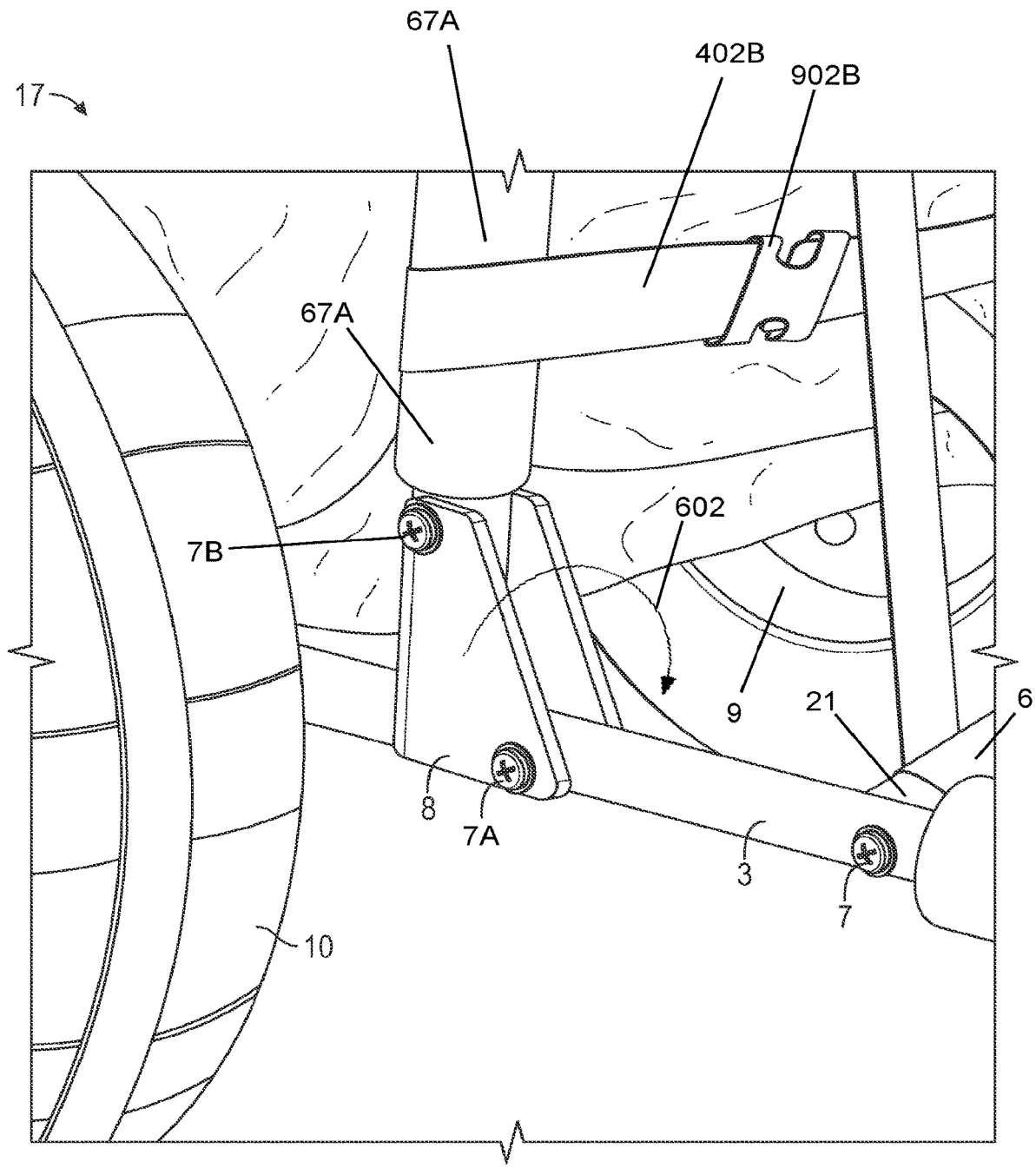
FIG. 9 illustrates an enlarged side view of the cart system and particularly a view that includes a strap from the mesh bag and one of the hinges.

Referring now to FIG. 9, this figure illustrates an enlarged side view of the cart system 101 and particularly a view that includes a strap 402B from the mesh bag 4 and one of the hinges 8. In FIG. 9, the buckle 902B for strap 402B is visible. The buckle 902B joins two ends of the strap 402B together. Other coupling devices besides buckles 902 may be employed without departing from the scope of this disclosure.

As noted above in connection with FIG. 6E, and as also shown in FIG. 9, the hinge 8 rotates around the first fastener 7A and the first fastener 7A functions as a pivot point for the hinge 8. The first fastener 7A couples the hinge 8 and the frame member 3 together. This also means that second fastener 7B and telescoping support member 67A rotate around the first fastener 7A, if the first fastener 7A and frame member 3 are the frame of reference (stationery). The second fastener 7B couples the hinge 8 to the telescoping support member 67A.

Figure 10A:
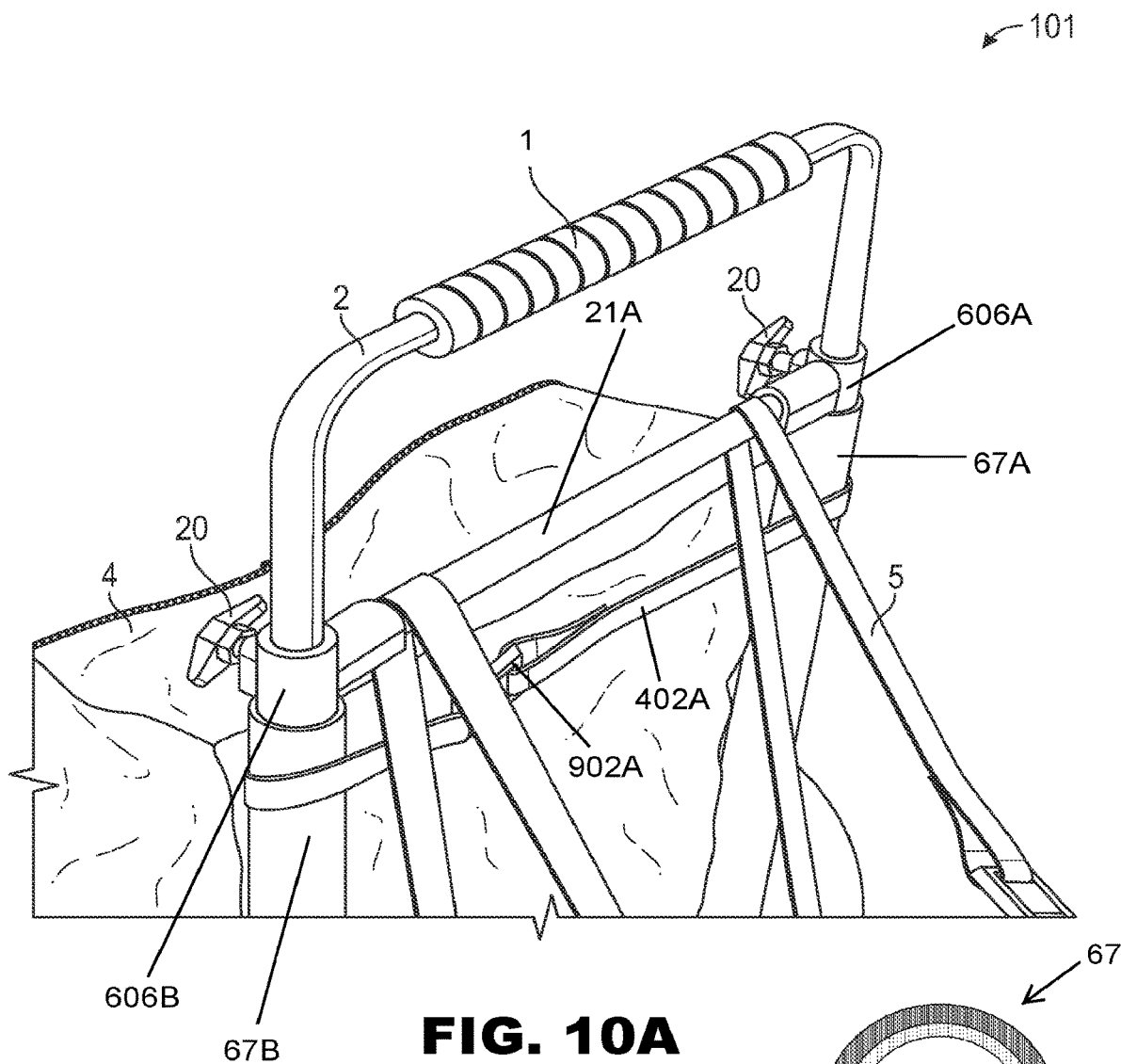
FIG. 10A illustrates an enlarged view of a top portion of the cart system that includes the handle with grip along with the three-way coupler and the telescopic support members coupled to the cross-bar.

Referring now to FIG. 10A, this figure illustrates an enlarged view of a top portion of the cart system 101 that includes the handle 2 with grip 1 along with the three-way couplers 606 and the telescopic support members 67 coupled to the cross-bar 21A. This view also shows the upper strap 402A for the mesh bag 4 which includes its buckle 902A. The view of FIG. 10 also shows the telescoping locking mechanisms 20 engaging the three-way couplers 606. Specifically, the telescoping locking mechanisms 20 engage the threaded apertures 23 (not visible in FIG. 10, but see FIG.

6C) and penetrate there-through to contact a side (not shown) of the handle 2 to lock it in its present position. As noted previously, the three-way couplers join the handle 2 to each telescoping support member 67 and the cross-bar 21A.

Figure 10B:
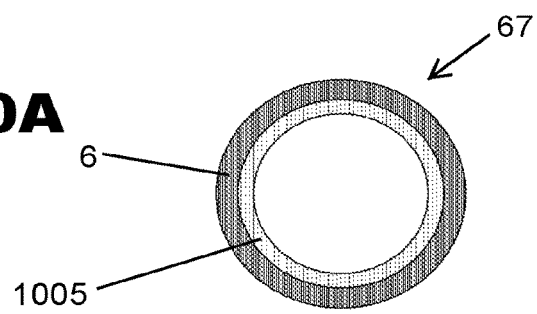
FIG. 10B illustrates a cross-sectional view of the telescoping support members.

Referring now to FIG. 10B, this figure illustrates a cross-sectional view of the telescoping support members 67. As shown in this view, each support member 67 may comprise an inner tubular member 1005 which has a diameter that is greater than a diameter of the handle 2. Each support member may further comprise a padding layer 6, similar to the padding 6 present on the cross-bars 21 and frame members 21 of the cargo area 17 described above.

Figure 11:
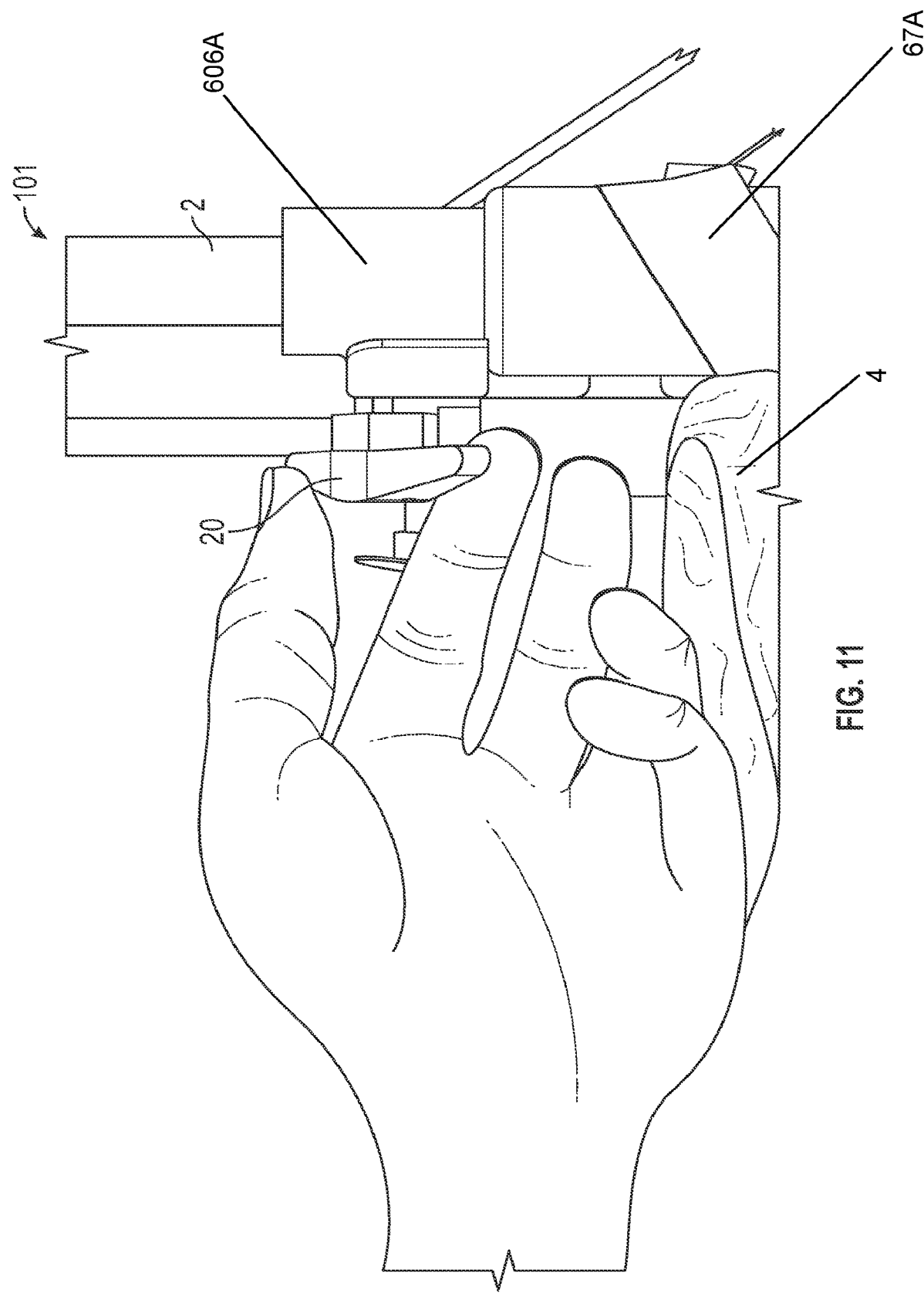
FIG. 11 illustrates a side perspective view of an operator attaching a telescoping locking mechanism into a three-way coupler.

Referring now to FIG. 11, this figure illustrates a side perspective view of an operator attaching a telescoping locking mechanism 20 into a three-way coupler 606A. As noted previously, each three-way coupler 606 couples a portion of the handle 2 to one telescoping support member 67A as well as one end of a cross-bar 21A (not visible in FIG. 11, but see FIG. 10A). The threaded end of the telescoping locking mechanism penetrates through a threaded hole 23 (see FIG. 6C & FIG. 12) of the coupler 606A in order to contact a top surface of the handle 2.

Figure 12:
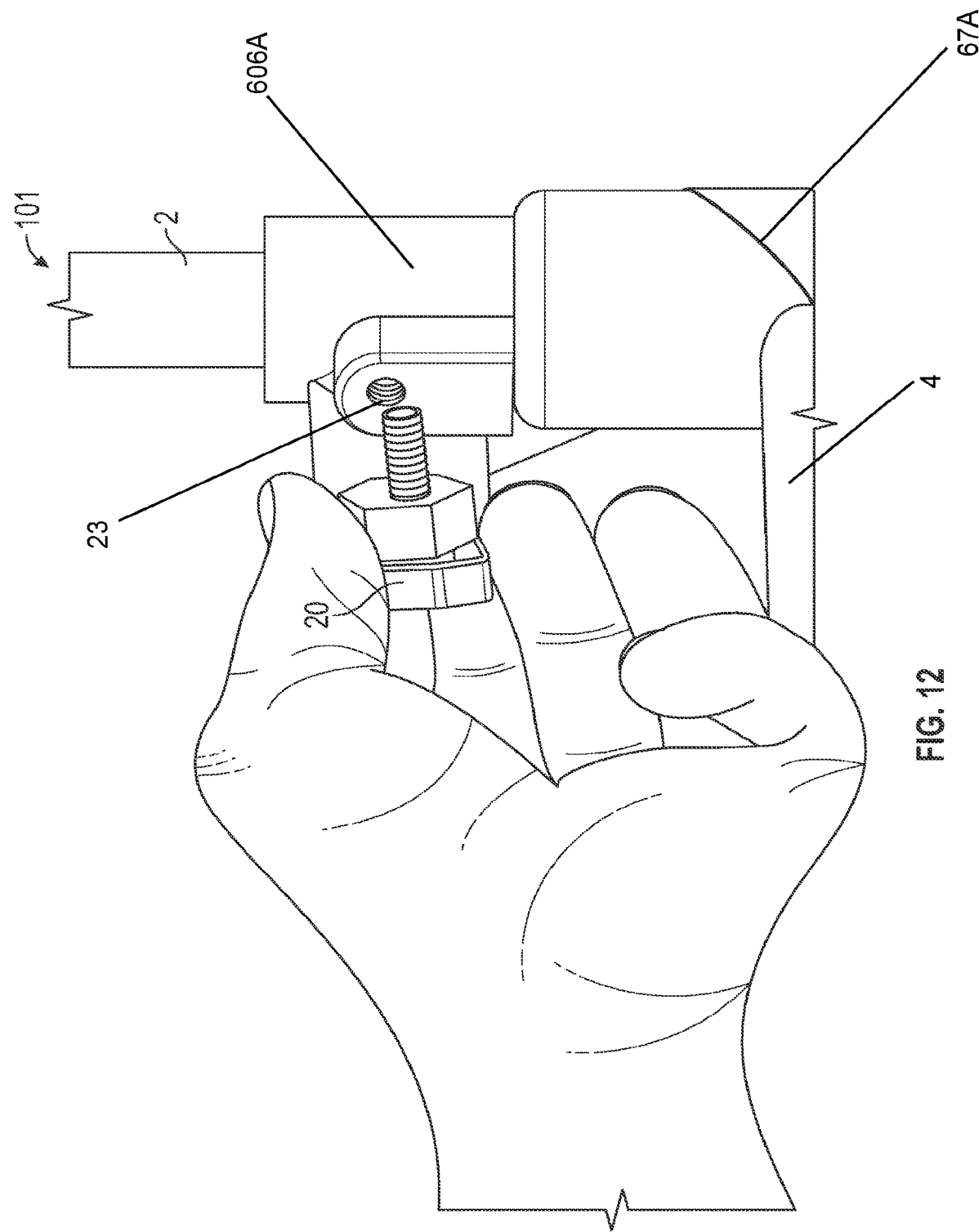
FIG. 12 illustrates a side perspective view of an operator removing a telescoping locking mechanism from a three-way coupler.

Referring now to FIG. 12, this figure illustrates a side perspective view of an operator removing a telescoping locking mechanism 20 from a three-way coupler 606A. As noted previously, each three-way coupler 606 couples a portion of the handle 2 to one telescoping support member 67A as well as one end of a cross-bar 21A (not visible in FIG. 11, but see FIG. 10A). The threaded end of the telescoping locking mechanism penetrates through a threaded hole 23 of the coupler 606A in order to contact a top surface of the handle 2. In this FIG. 12, since the locking mechanism 20 has been removed from the hole 23, the telescoping handle 2 is free to move within the coupler 606A as well as the telescoping support member 67A.

Figure 13:
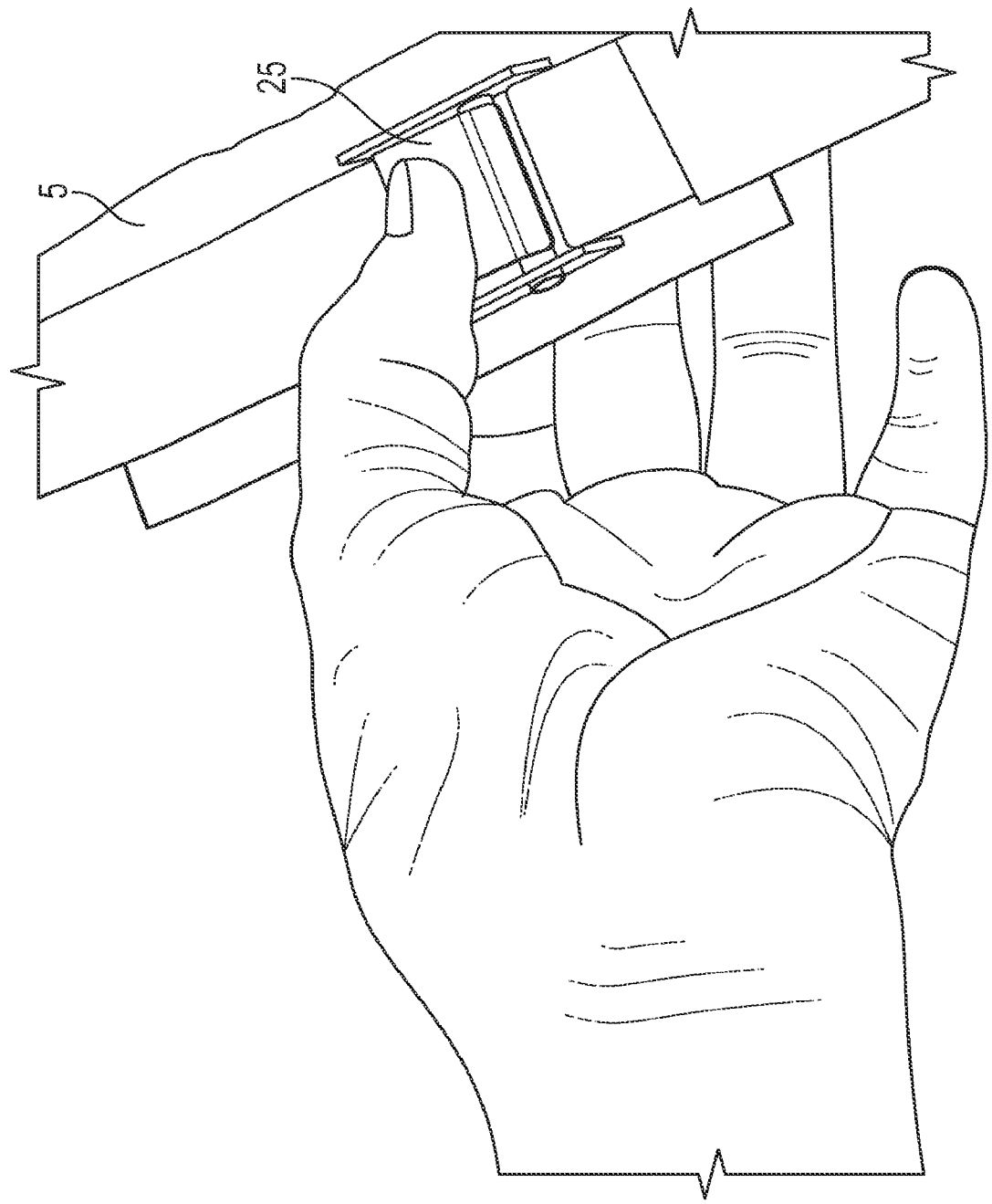
FIG. 13 illustrates a perspective view of a strap and its fastener being adjusted by an operator.

Referring now to FIG. 13, this figure illustrates a perspective view of a strap 5 and its fastener 25 being adjusted by an operator. As noted previously, according to one exemplary embodiment, the strap fastener 25 may comprise a cam buckle. However, other strap fasteners 25 are possible and may be employed without departing from the scope of this disclosure as understood by one of ordinary skill in the art.

Each strap 5 may have a length of about 10.0 feet. Each strap 5 may be made from nylon. However, other materials and sizes are possible for the straps 5 and are included within the scope of this disclosure.

Figure 14:
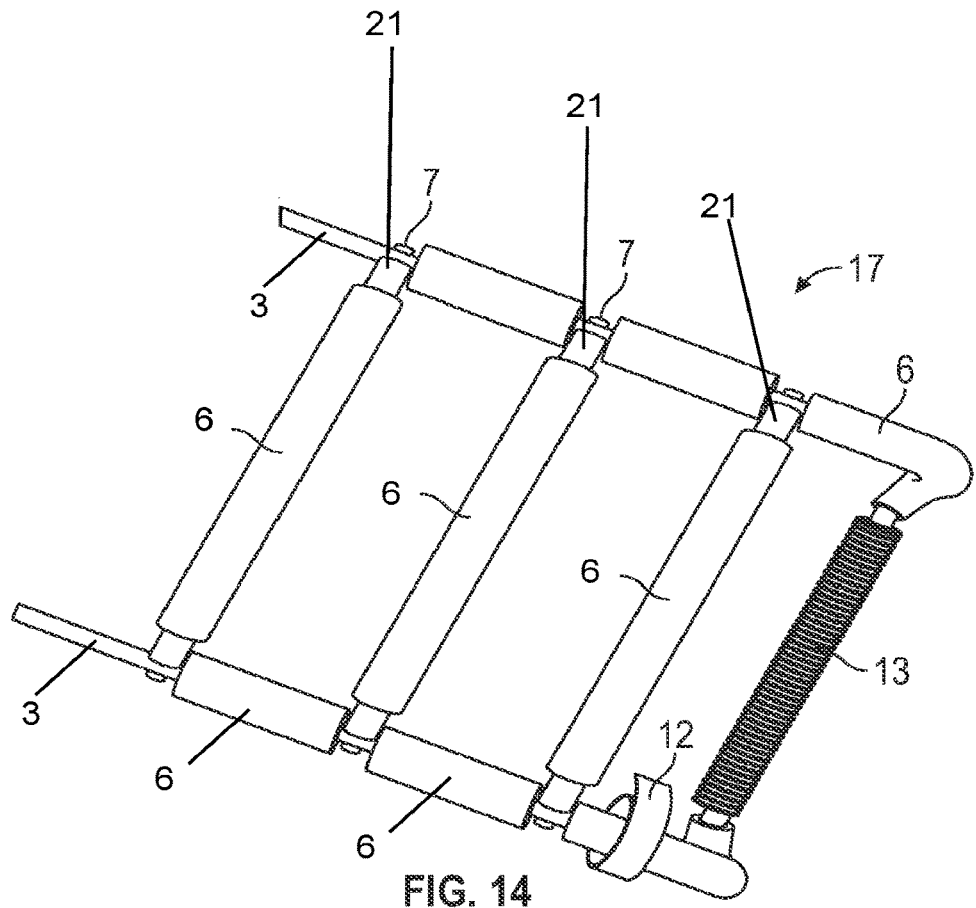
FIG. 14 is a top perspective view of the cargo area defined by frame members and cross-bar members which are at right angles with the frame members.

Referring now to FIG. 14, this figure is a top perspective view of the cargo area 17 defined by frame members 3 and cross-bar members 21 which are at right angles with the frame members 3. As noted previously, both the frame members 3 and cross-bar members 21 may have padding 6 which envelopes/surrounds these structures. The padding 6 provides an increased coefficient of friction with any cargo compared to a smooth metal surface.

Figure 15:
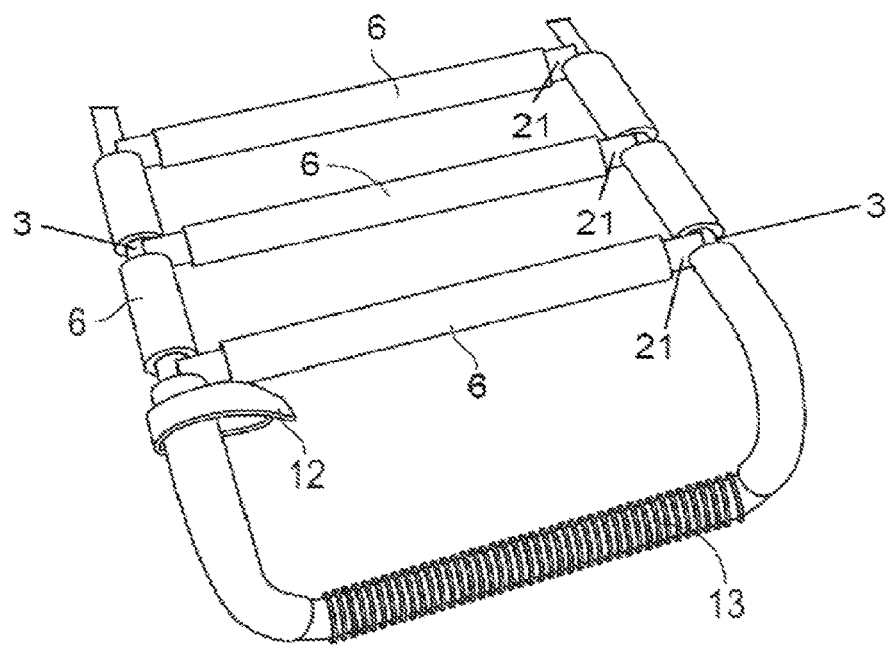
FIG. 15 illustrates another top perspective view of the cargo area defined by the frame members and cross-bar members.

Referring now to FIG. 15, this figure illustrates another top perspective view of the cargo area defined by the frame members 3 and cross-bar members 21. As noted previously, the system 101 may include a base protector 13 that may comprise a knurled sleeve or finned tube cover that encloses the bottom frame member (under 13). As understood by one of ordinary skill in the art, knurling is a manufacturing process, typically conducted on a lathe, whereby a pattern of straight, angled or crossed lines is rolled into a material.

The base protector 13 protects the metal frame member 3 which is present underneath the protector 13. The base protector 13 usually touches a ground surface when the cart system 101 is at rest. Meanwhile, on the opposite side of the cart system 101 are the two wheels 10 (see FIG. 1A) which support the cart system 101 when at rest and when in-motion.

Figure 16:
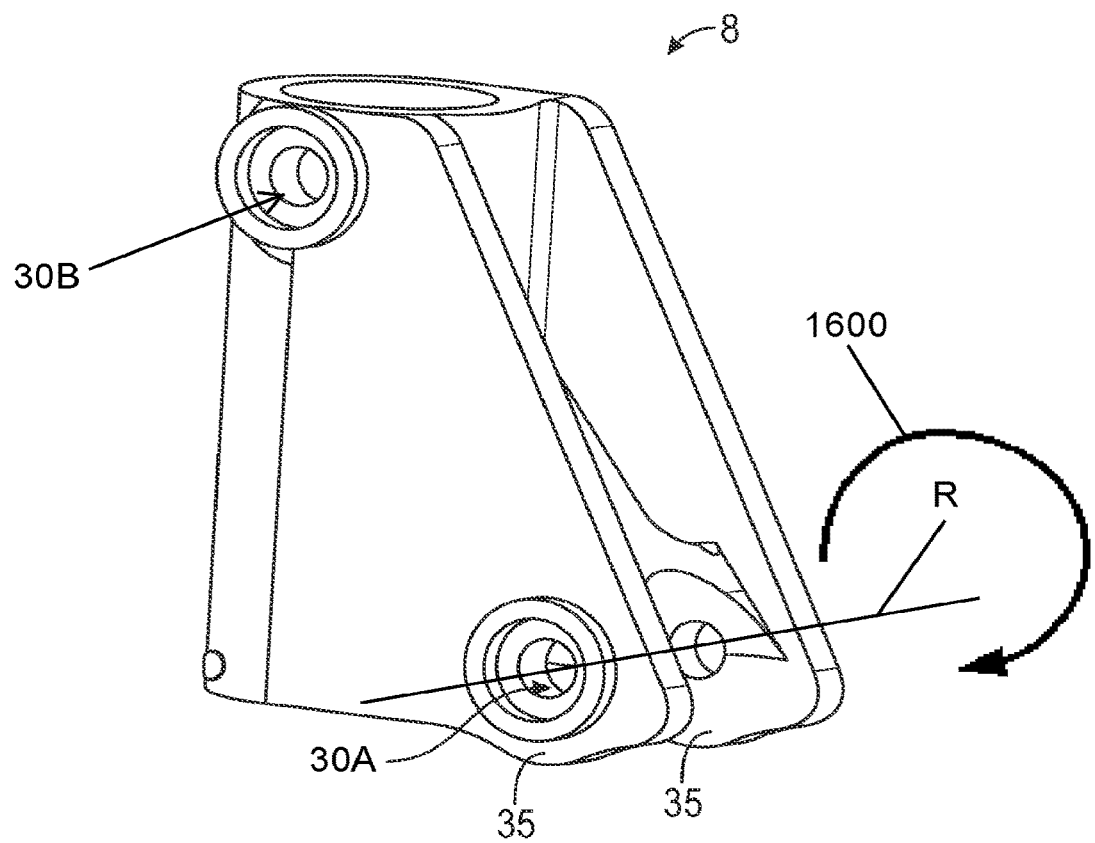
FIG. 16 illustrates a side perspective view of a first exemplary embodiment for the hinge as illustrated in FIG. 1A and other figures.

Referring now to FIG. 16, this figure illustrates a side perspective view of a first exemplary embodiment for the hinge 8 as illustrated in FIG. 1A and other figures. Each hinge 8 may comprise a first aperture 30A that receives a fastener (not shown in FIG. 16, but see FIG. 9). According to the exemplary embodiment illustrated in FIG. 16, each hinge 8 may further include an aperture structural reinforcement member 35 that increases a thickness of material surrounding each lower aperture 30A. This reinforcement member 35 may increase the strength of the first aperture 30A relative to a fastener which passes through the first aperture 30A.

The first aperture 30A may define an axis of rotation R such that the hinge 8 may rotate around this axis R. Generally, the first aperture 30A is aligned with another aperture (not shown) which is present in a frame member 3 that defines the cargo area 17 (see FIGS. 14-15). A fastener may pass through the first aperture 30A and the aperture in the frame member 3 (not shown in FIG. 16, but see FIG. 9).

The hinge 8 may further comprise a second aperture 30B for receiving another fastener (see FIG. 9). The second aperture 30B may align with an aperture in a telescoping support member 67 (see FIG. 9).

Each hinge 8 may be made from a high strength resin. As discussed previously, the hinge 8 with its axis of rotation allows a handle 2 coupled to the telescoping support member 67 to fold down flat on the cargo area 17 for easy & compact storage. Since each hinge 8 in a preferred, exemplary embodiment is made from a high strength resin, the open/close motion of the hinge 8 will not scratch or wear down each frame member 3 of the cargo area which supports a hinge 8.

While a high strength resin material is preferred for each hinge 8, other materials are possible and are included within the scope of this disclosure. Other materials include, but are not limited to, metals, ceramics, composites, etc.

Figure 17:
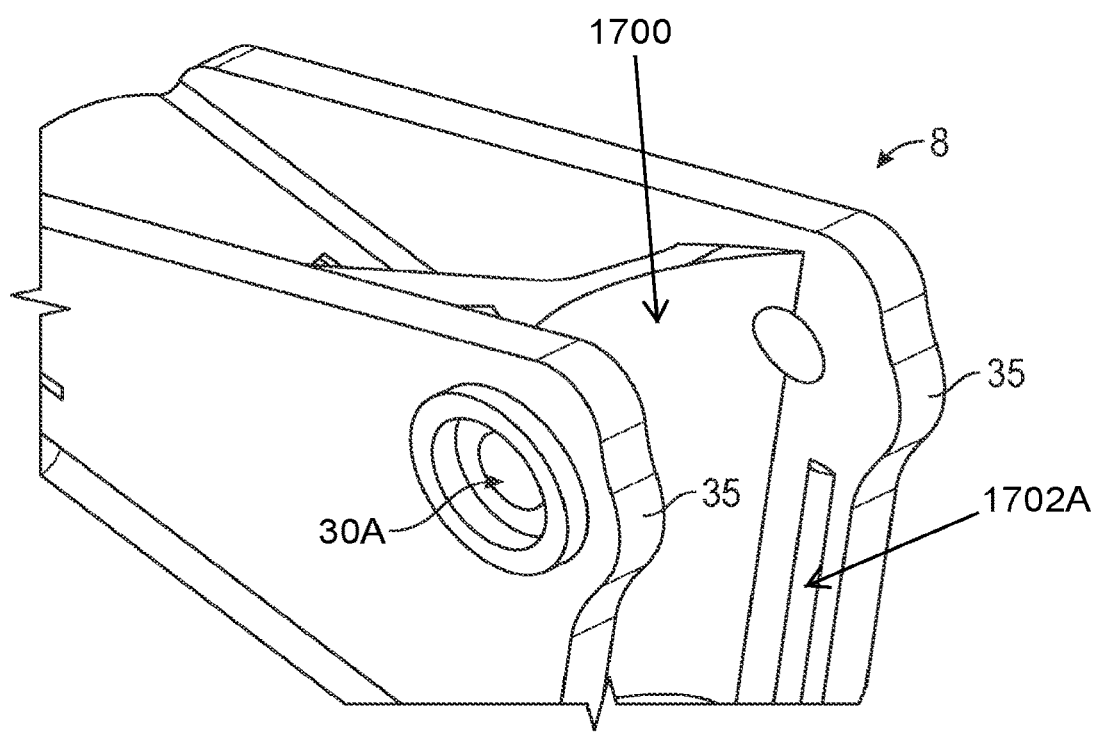
FIG. 17 illustrates a close-up side, perspective view of the hinge illustrated in FIG. 16.

Referring now to FIG. 17, this figure illustrates a close-up side, perspective view of the hinge 8 illustrated in FIG. 16. This figure highlights or emphasizes the reinforcement member 35 present around the first aperture 30A present in the hinge 8. The view further illustrates a half-pipe (half cylinder) member 1700 that contacts a frame member 3 when the cart system 101 is in an un-folded or non-compact state, as illustrated in FIG. 1A. This half-pipe member 1700 rotates away from a frame member 3 when the cart system 101 is in its folded or compact state as illustrated in FIGS. 1F, 19A-19C. In this figure, the half-pipe 1700 is visible along with a first gripping device 1702A. FIG. 17 also shows a first gripping device 1702A that grasps and engages the frame member 3 when the cart system 101 is in an un-folded or non-compact state, as illustrated in FIG. 1A.

Figure 18A:
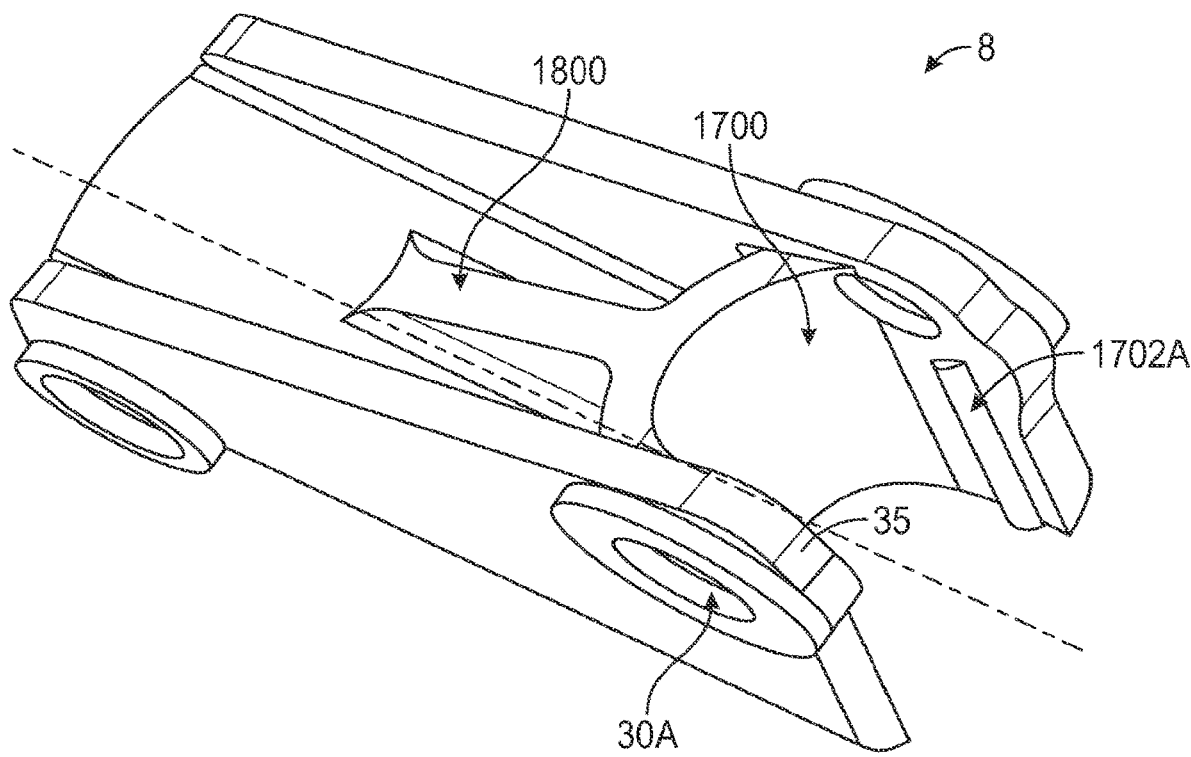
FIG. 18A illustrates a bottom perspective view of the hinge 8 illustrated in FIGS. 16-17.

Referring now to FIG. 18A, this figure illustrates another bottom perspective view of the hinge 8 illustrated in FIGS. 16-17. In this FIG. 18A, a frame stop member 1800 is visible. This frame stop member 1800 comes in contact with a frame member 3 when the cart system 101 is in its folded or in a compact state as illustrated in FIGS. 1F, 19A-19C. When frame stop member 1800 contacts a frame member 3, this means that the half-pipe member 1700, as well as its gripping devices 1702, will not be contacting the frame member 3 in this state.

Figure 18B:
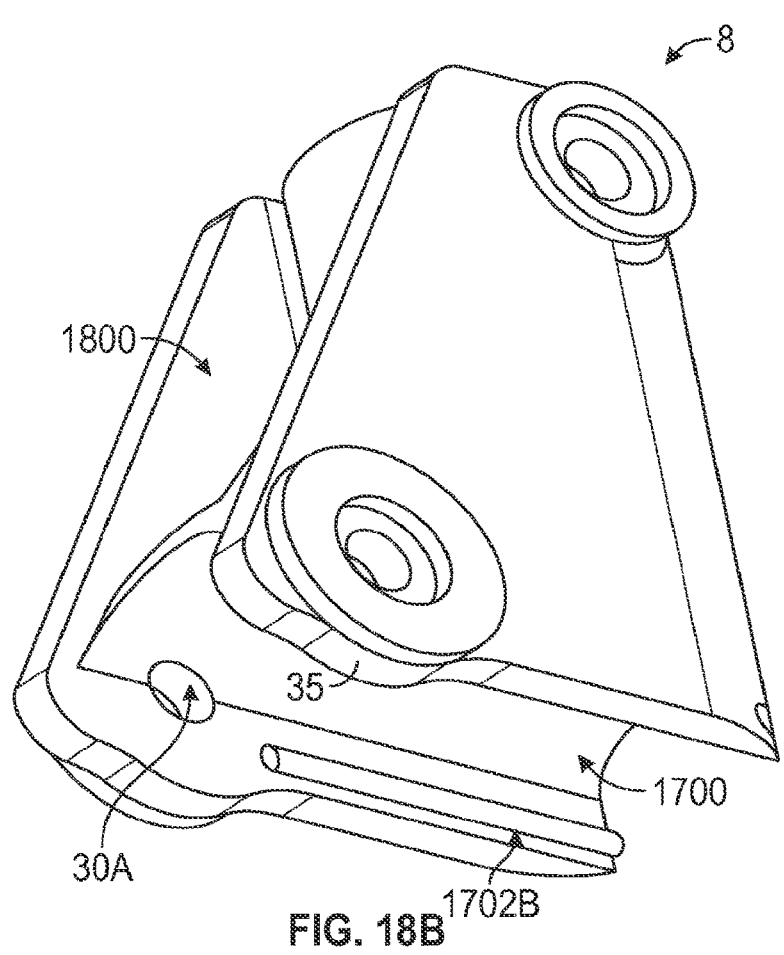
FIG. 18B illustrates a side, bottom perspective view of the hinge illustrated in FIGS. 16-18A.

Referring now to FIG. 18B, this figure illustrates another side, bottom perspective view of the hinge illustrated in FIGS. 16-18A. In this view, the second gripping device 1702B of the half-pipe member 1700 is now visible. The half-pipe member 1700 has these pair of first & second gripping devices 1702A, 1702B to engage a frame member 3 so that the hinge 8 remains in a locked, upright position for its operational state meaning when the cart system 101 is not in its folded or not in its compact state (i.e. in its operational state for supporting cargo).

Figure 18C:
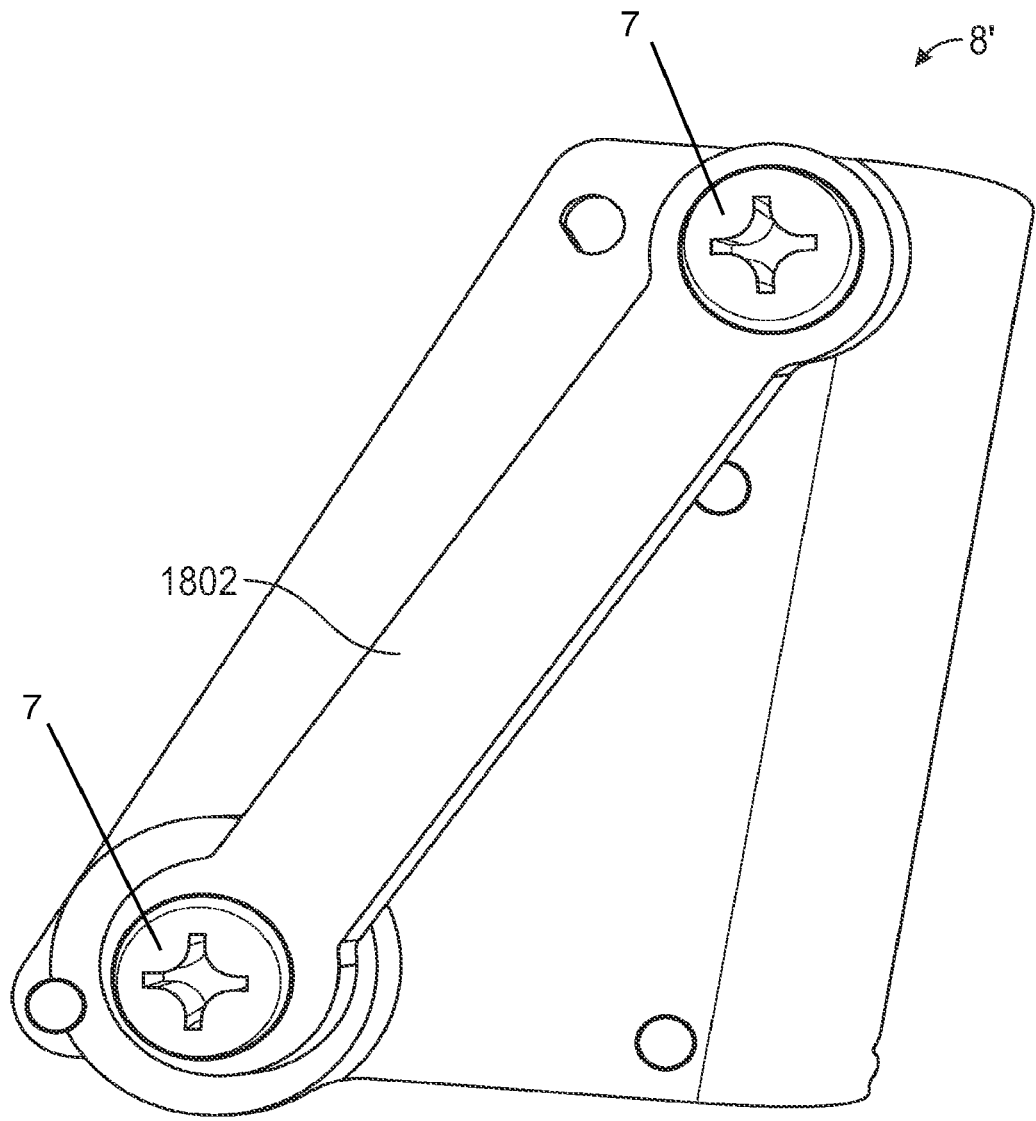
FIG. 18C illustrates a side view of a hinge for another alternative exemplary embodiment of the system.

Referring now to FIG. 18C, this figure illustrates a side view of a hinge 8' for another alternative exemplary embodiment for the system 101. According to this alternative exemplary embodiment, the hinge 8' may further include a support member 1802. Support member 1802 may help eliminate stress on hinge 8 when the system 101 is hauling/supporting cargo in the cargo area 17.

The support member 1802 may comprise metal, such as, stainless steel. Other metals are possible and are included within the scope of this disclosure. Further, other materials besides metal, such as another resin or composite, may be employed for the support member 1802 without departing from the spirit and scope of this disclosure as understood by one of ordinary skill in the art. The support member 1802 may have a "figure-8" shape because fasteners 7 may penetrate through holes at either of its ends. The holes of the support member 1802 may align with the holes 30 of the hinge 8 described previously.

Referring now to FIG. 19A, this figure illustrates the cart system 101 in a partially collapsed state where the telescopic support member 67A may pivot or rotate around frame member 3 by the hinge 8, and specifically the lower fastener of the hinge 8. Movement arrow M indicates that the handle 2 and telescopic support member 67A may move towards frame member 3 (to collapse system 101) or away from frame member (to expand system 101).

Referring now to FIG. 19B, this figure illustrates a first side perspective view of the cart system 101 in a collapsed state. As seen in this figure, in this collapsed state for the system 101, the handle 2 and base protector 13 are positioned adjacent to each other in this state. Meanwhile, when the system 101 is in an expanded or operational state (see FIGS. 1A, 2, & 3), the handle 2 and base protector 13 are at a significant distance from each other.

Referring now to FIG. 19C, this figure illustrates a second side perspective view of the cart system 101 in a collapsed state and which is a mirror-opposite view relative to the view of FIG. 19B. In this FIG. 19C, the coupler 12 is positioned closer to the viewer compared to the opposite view illustrated in FIG. 19B. The coupler 12 is illustrated in an "open-state" where it is ready to couple a frame member 3 having padding 6 to one of the telescoping support members 67.

Figure 20:
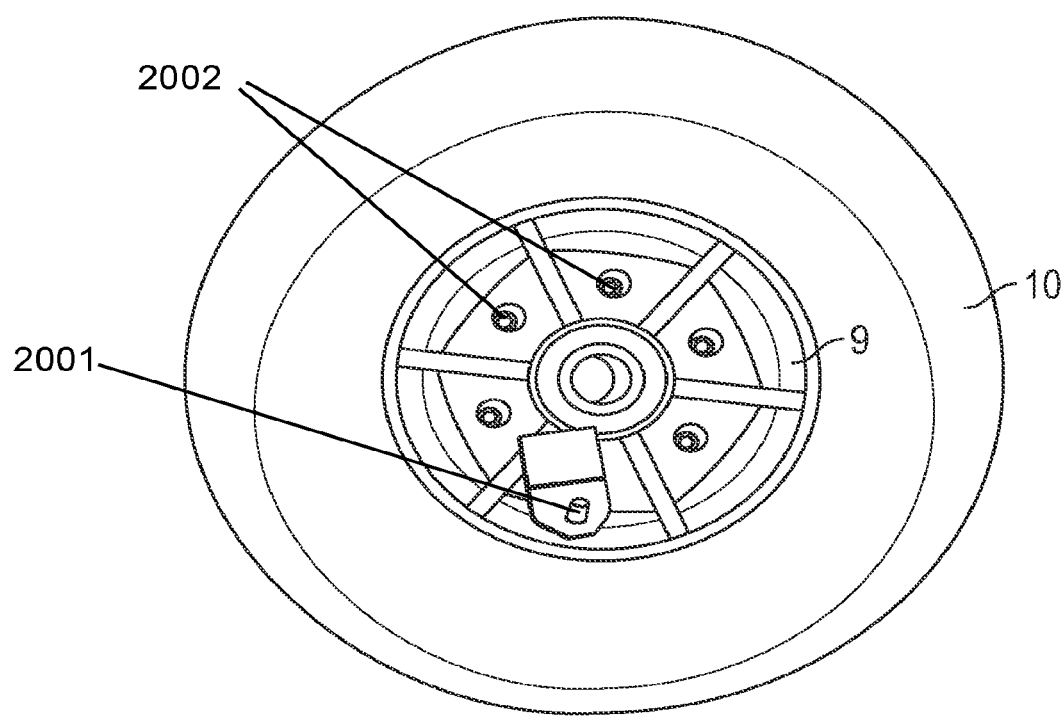
FIG. 20 illustrates a side view of one of the wheels which has an inflatable balloon tire.

Referring now to FIG. 20, this figure illustrates a side view of one of the wheels 9 which has an inflatable balloon tire 10. The wheel 9 further includes a valve 2001 coupled to the tire 10. The valve may comprise an air valve, such as, but not limited to, a Shrader valve, as understood by one of ordinary skill in the art. The 13.0 inch diameter balloon tires 10 illustrated in the several figures are sold by Ningbo Yonk Machinery Co. Ltd.; NO. 8 Moganshan Rd. Beilun, Ningbo China, 315800. The inventors have discovered that these tires are generally inflated with a pressure between about 2.0 to about 3.0 psi so that they may rotate or turn efficiently when riding over soft-sand based environments. To achieve this predetermined pressure range, the inventors have developed the tire inflation tool 55 as described above and illustrated in FIGS. 1D-1E and FIGS. 27-29D.

Each wheel 9 illustrate in FIG. 20 may comprise two components: each component may slide through either side of the balloon tire and bolt together with fasteners 2002, such as bolts. Each wheel 9 is usually made of a high strength resin making it resistant to salt water and sand. Each wheel 9 may have about a 20.0 mm hub/hole for the axle 40.

Each wheel 9 usually has no bearings relative to its connection or coupling to the axle 40. That is, each wheel 9 is generally designed so that salt and sand will not affect it and so that the wheel 9 rotates around the axle 40 (see FIG. 1B) without any bearings.

Each tire 10 may be made from a flexible material, such as, but not limited to polyurethane. Polyurethane makes the tires extremely tough and durable. The flexible material allows the tire 10 to traverse over soft sand, gravel, rocks, asphalt, curbs, stairs and roots without shock or damage. Other flexible materials, besides polyurethane are possible and are included within the scope of this disclosure.

Figure 21:
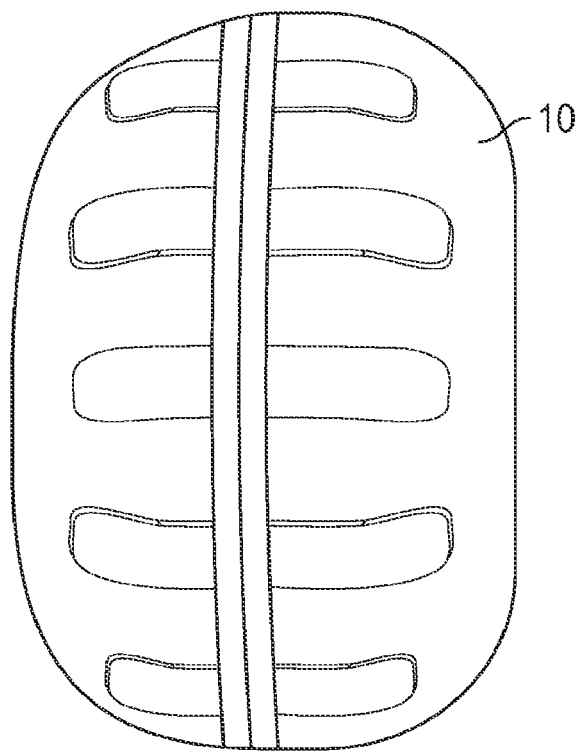
FIG. 21 illustrates a front/tread-view view of an inflatable tire according to one exemplary embodiment and shows the tire's width dimension.

Referring now to FIG. 21, this figure illustrates a front/tread view of an inflatable tire 10 according to one exemplary embodiment and shows the tire's width dimension. The wider shape of the tire 10 shown in FIG. 21 is a result of the under inflation pressure range of between about 2.0 and 3.0 pressure range which was discovered by the inventors.

Figure 22:
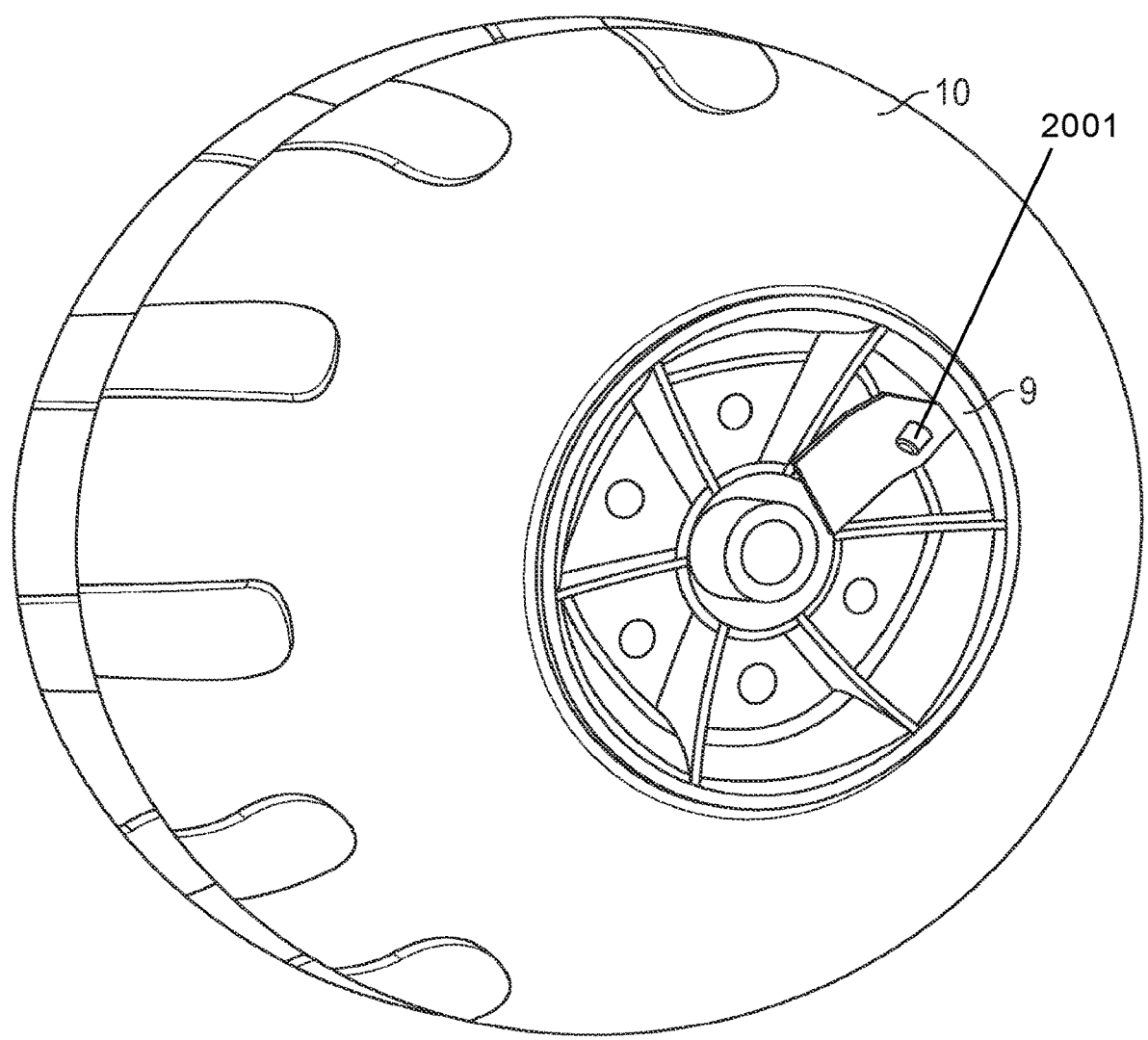
FIG. 22 illustrates a side perspective view of the inflatable tire having its wheel.

Referring now to FIG. 22, this figure illustrates a side perspective view of the inflatable tire 10 having its wheel 9. In this view, the valve 2001 is also visible. While it is contemplated that standard air may be used to inflate the tires 10, other gases are possible and are included within the scope of this disclosure. Other gasses include, but are not limited to, nitrogen, carbon dioxide, etc.

Figure 23A:
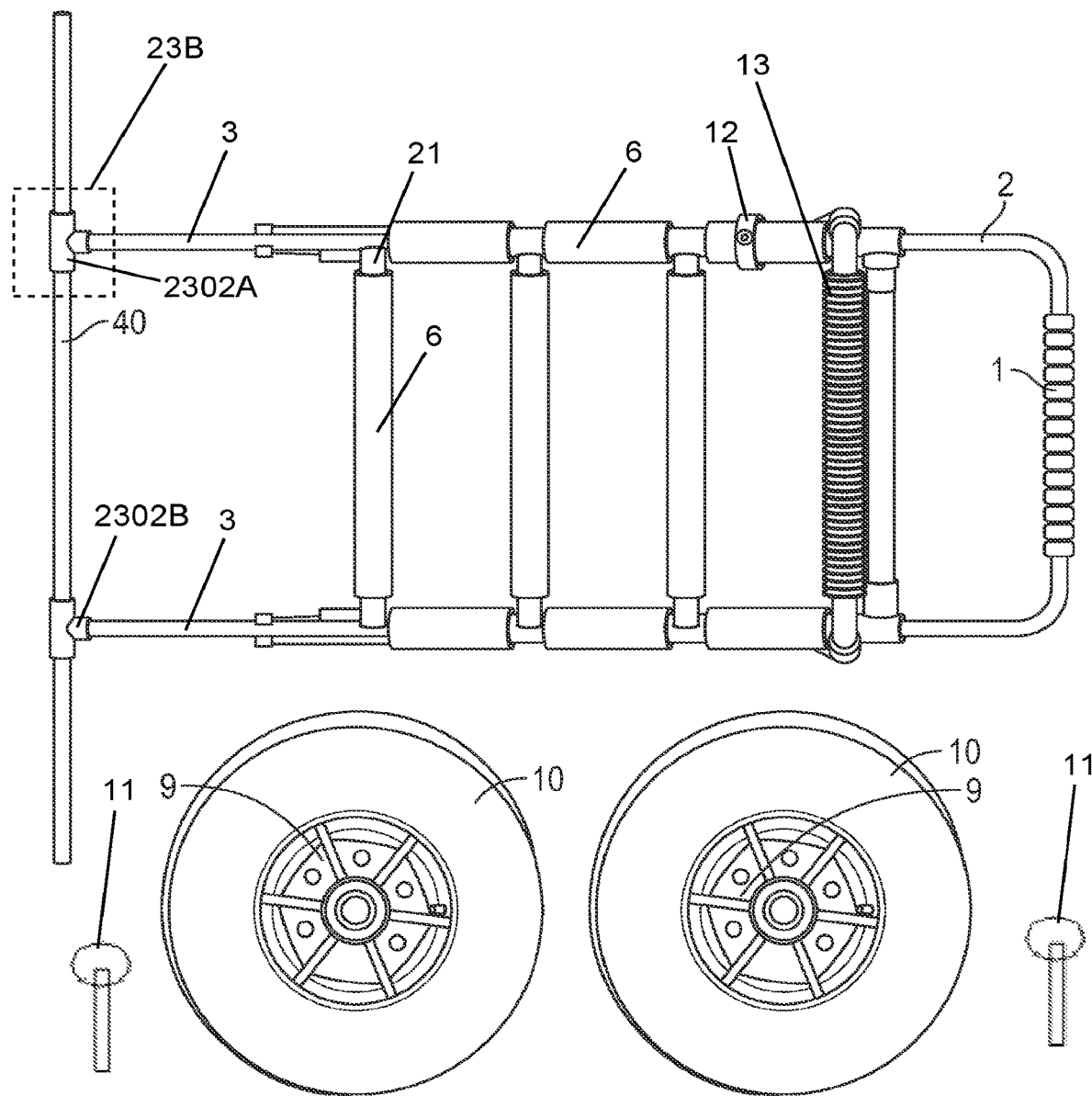
FIG. 23A illustrates the cart system in a collapsed and stowable state where the handle has been folded towards the base protector and the tires having wheels have been removed from the axle.

Referring now to FIG. 23A, this figure illustrates the cart system 101 in a collapsed and stowable state where the handle 2 has been folded towards the base protector 13 and the tires 10 having wheels 9 have been removed from the axle 40. This view of FIG. 23A further illustrates the lynch pins 11 which have been removed from axle 40 so that wheels 10 may be removed from the axle 40.

FIG. 23A further illustrates two T-connectors 2302A, 2302B. The T-connectors couple the axle 40 to the frame members 3. Each T-connector is made of a high strength resin and keeps the axle 40 attached to the frame members 3. View 23B corresponds with FIG. 23B described below. View 23B is an enlargement of the T-connector 2302 and how it is attached to the axle 40 and the frame member 3.

Figure 23B:
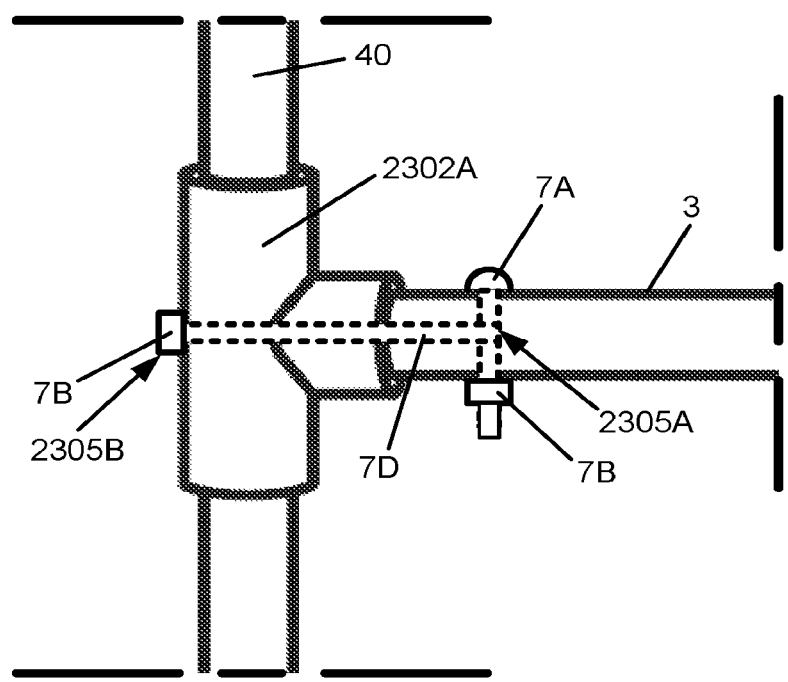
FIG. 23B illustrates an enlargement of the T-connector and how it is attached to the axle and the frame member.

Referring now to FIG. 23B, this figure illustrates an enlargement of the T-connector 2302 and how it is attached to the axle 40 and the frame member 3. Each T-connector 2302 may be coupled to the axle 40 and a frame member 3 by at least two fasteners 7A, 7D. Portions of the two fasteners 7A, 7D have been illustrated with dashed lines to indicate that these portions are not visible from the outside of the axle 40, T-connector 2302, and frame member 3.

Each fastener 7A, 7D may comprise a threaded type fastener. Specifically, fastener 7A may comprise a standard threaded bolt with screw head. The threaded bolt 7A may receive a threaded nut 7B for locking the bolt 7A against the frame member 3. The frame member 3 has at least two apertures/holes for receiving the threaded bolt 7A.

Meanwhile, fastener 7D may comprise a special threaded coupler which has an aperture/hole in first end 2305A for receiving the threaded portion of bolt 7A. The second end 2305B of fastener 7D has threads (not visible) for receiving a standard threaded nut 7B for locking the fastener 7D against the T-connector 2302A. The axle 40 that passes through the T-connector 2302A may also comprise at least two apertures/holes for receiving the fastener 7D. While the two fasteners 7A, 7D are threaded type fasteners, other types of fasteners are possible and are included within the scope of this disclosure. For example, instead of fasteners 7A, 7D, used with T-connectors 2302, welds could be employed and substituted for the two fasteners 7A, 7D and the T-connector 2302 as understood by one of ordinary skill in the art.

Figure 24A:
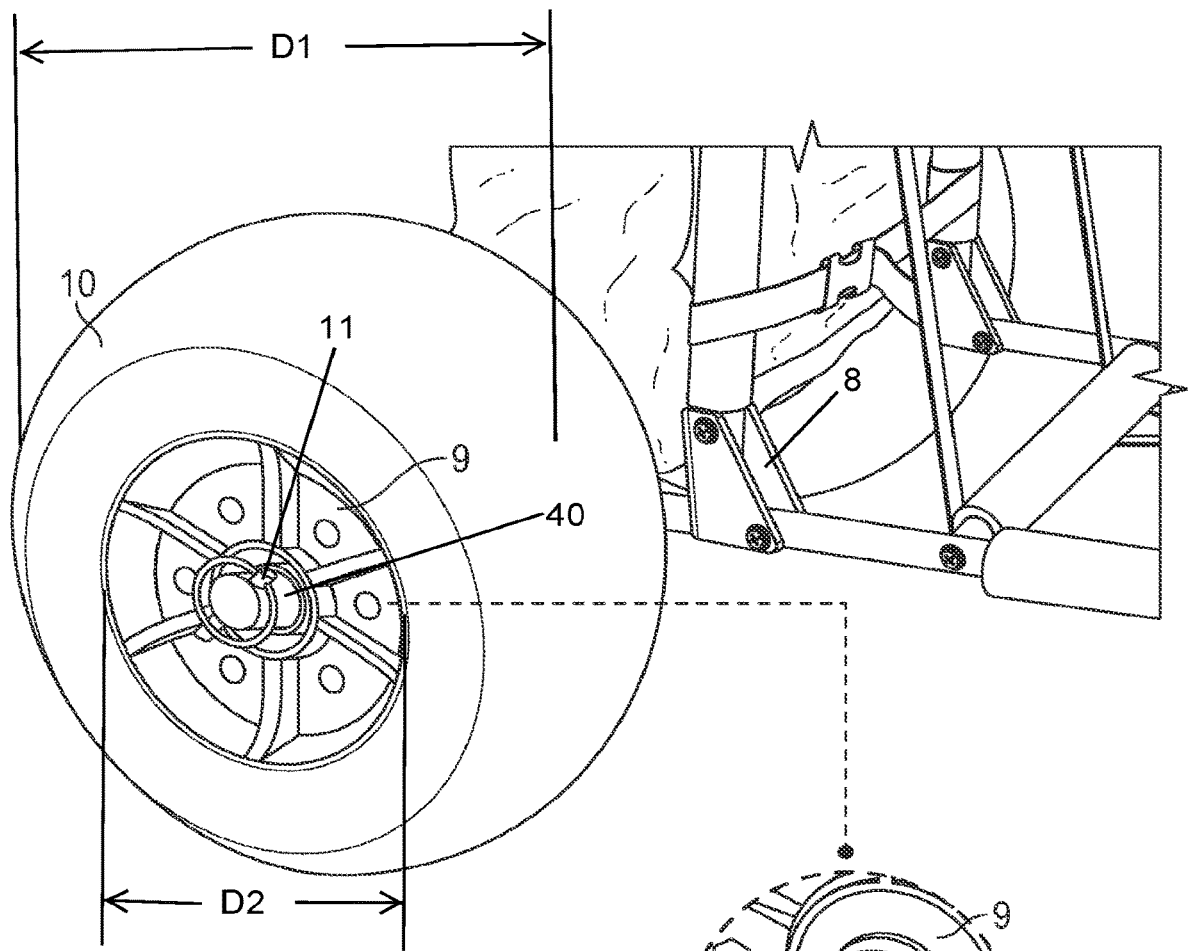
FIG. 24A illustrates an enlarged view of the wheel having an inflatable tire being coupled to the axle by a lynch pin.

Referring now to FIG. 24A, this figure illustrates an enlarged view of the wheel 9 having an inflatable tire 10 being coupled to the axle 40 by lynch pin 11. As noted previously, lynch pins 11 are a self-locking pin inserted crosswise as through the end of an axle or shaft 40. The circular ring at the end of the pin 11 "locks" in place when it is moved downward so one end contacts a surface of the pin. Such lynch pins 11 are available as of this writing and sold by G. L. Huyett of Minneapolis, KS. However, other types of pins as well as other fasteners are possible and are included within the scope of this disclosure.

As described above, each inflatable tire 10 may have a maximum diameter (D1) of 13.0 inches. Meanwhile, each wheel 9 may comprise a diameter (D2) of about 6.5 inches. The diameter (D2) of each wheel may be adjusted upwards or downwards. However, the contact width (CW—see FIG. 1C) of each inflatable tire 10 on soft sand usually must fall within the range described above in connection with Table 1.

Further, as noted previously, each wheel 9 is designed to be coupled to the axle 40 without any additional hardware. In other words, each wheel 9 preferably has no bearings or other devices for coupling the wheel 9 to the axle 40. This means that an inner surface of each wheel 9, which has a diameter slightly larger than the diameter of the axle, directly contacts the axle 40 so that the wheel 9 slidingly contacts the axle 40. According to a preferred exemplary embodiment, each wheel 9 is made from a resin material while the axle 40 is made from metal.

Figure 24B:
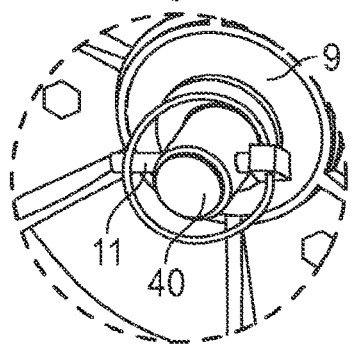
FIG. 24B illustrates an enlarged portion of FIG. 24A and specifically a region around the axle having a lynch pin.

Referring now to FIG. 24B, this figure further illustrates an enlarged portion of FIG. 24A and specifically a region around the axle 40 having a lynch pin 11. The lynch pin 11 generally penetrates the axle 40 via an aperture that goes through the hollow axle 40. The hollow axle 40 according to one exemplary embodiment may have an exemplary wall thickness of about 3.0 mm and an outer diameter of about three-quarters (¾) of an inch. However, other dimensions are possible and are included within the scope of this disclosure.

Figure 25:
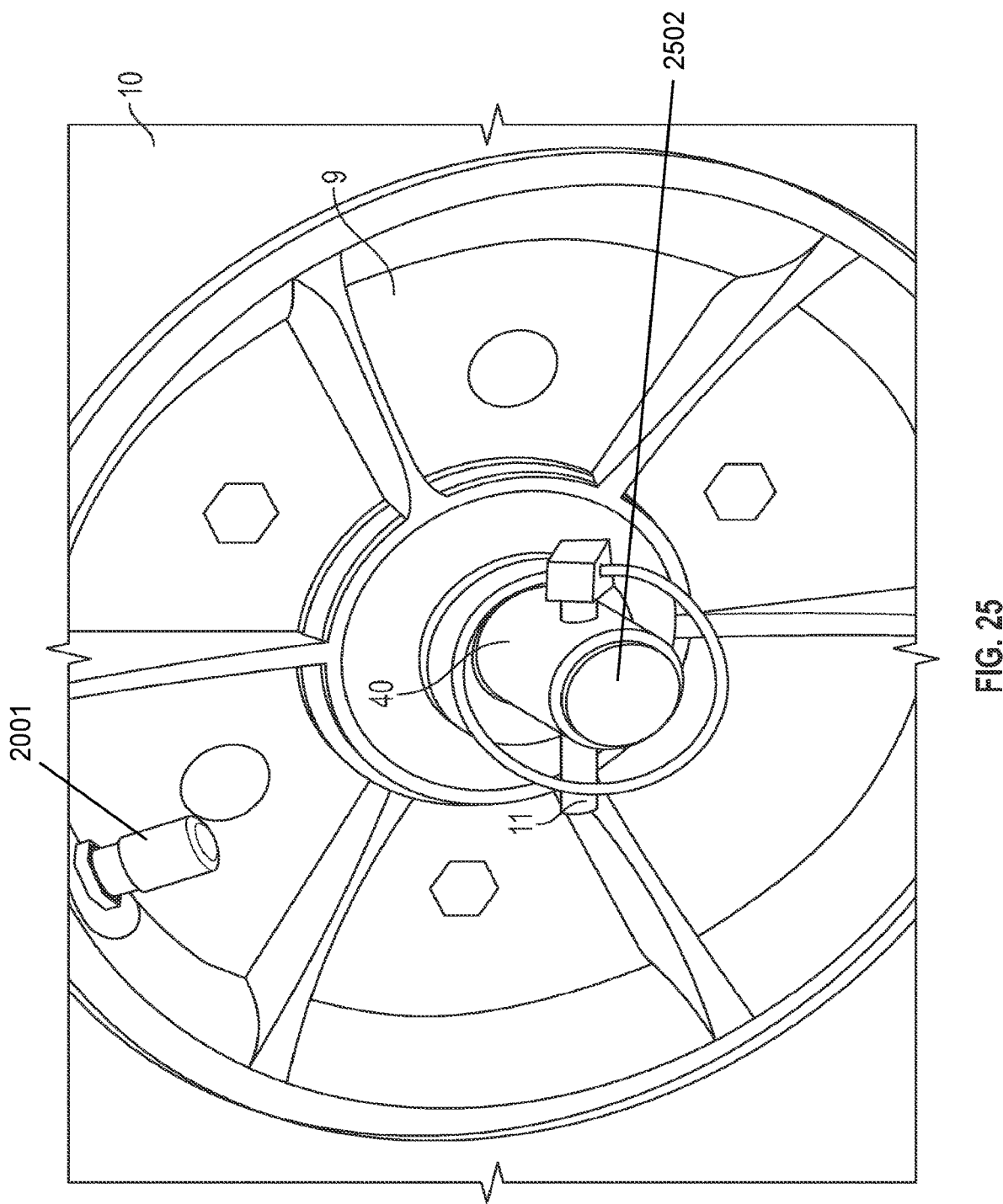
FIG. 25 illustrates an enlarged portion of a typical wheel having an inflatable tire according to an exemplary embodiment.

Referring now to FIG. 25, this figure illustrates an enlarged portion of a typical wheel 9 having an inflatable tire 10 according to an exemplary embodiment. While axle 40 is preferably hollow, its end may comprise an end cap 2502. The end cap 2502 can be made of plastic.

Figure 26B:
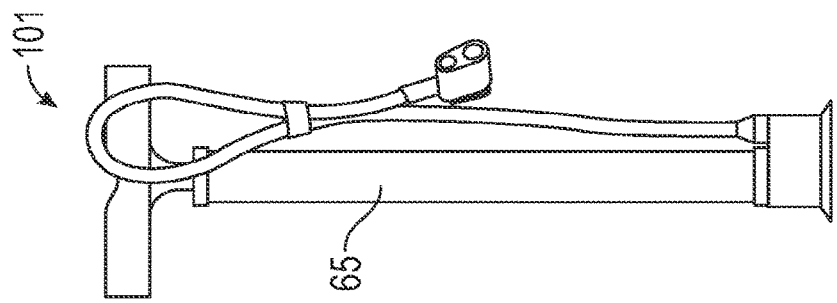
FIG. 26B illustrates one additional kit component that may be included in an exemplary kit for the cart system.
Figure 26A:
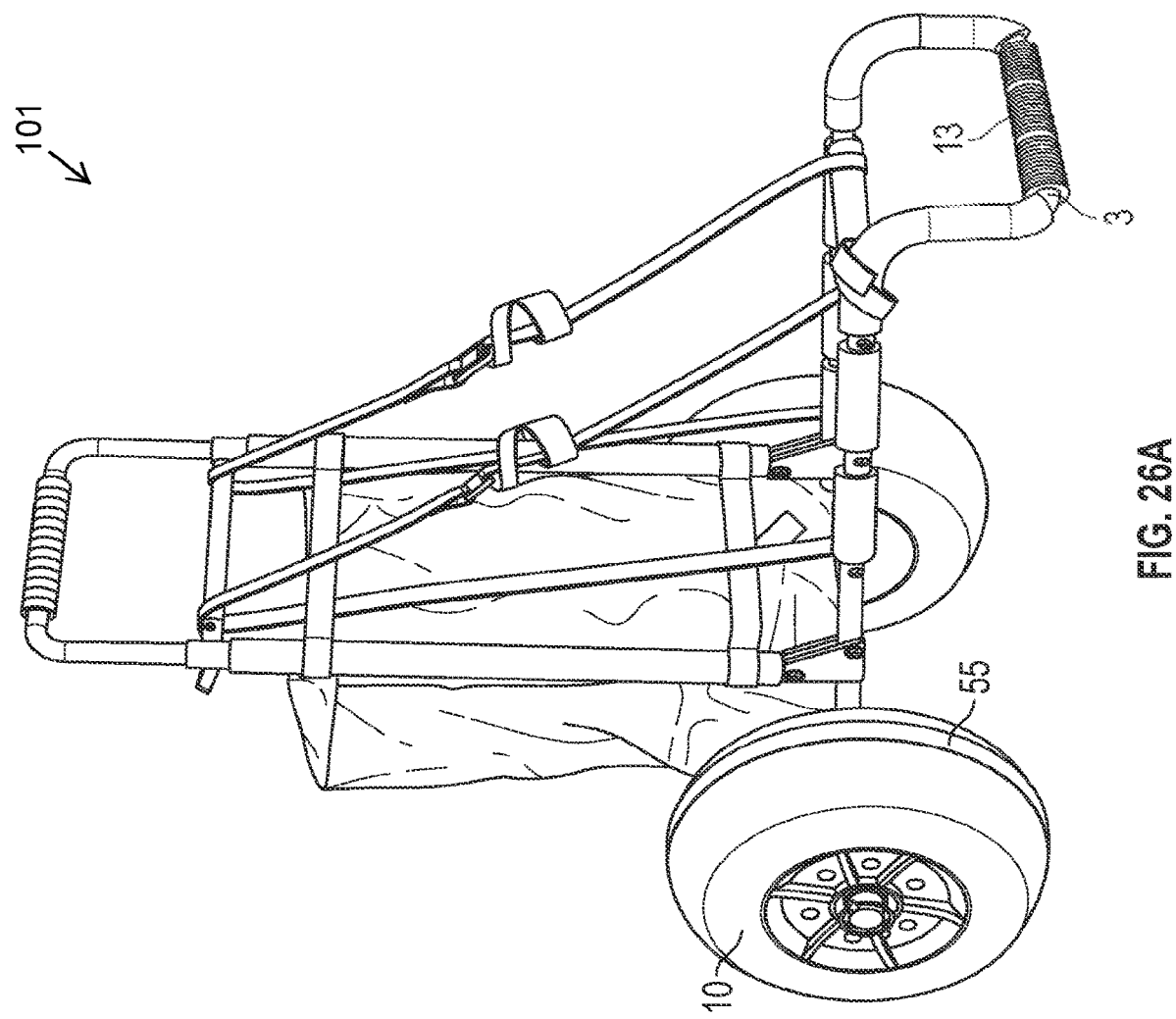
FIG. 26A illustrates a side perspective view of the cart system and with the tire inflation tool wrapped around one of the inflatable tires.

Referring now to FIG. 26A, this figure illustrates a side perspective view of the cart system 101 and with the tire inflation tool 55 wrapped around one of the inflatable tires 10. As noted previously, the inventors have discovered that to achieve the desired under-inflated pressure range of between about 2.0 psi to about 3.0 psi, an inflation tool 55 may be provided and which helps measure each tire's circumference C1 (see FIGS. 1D & 1E).

Referring now to FIG. 26B, this figure illustrates one additional kit component 65 that may be included in an exemplary kit for the cart system 101. This additional kit component 65 may comprise a hand-powered air pump.

Figure 27:
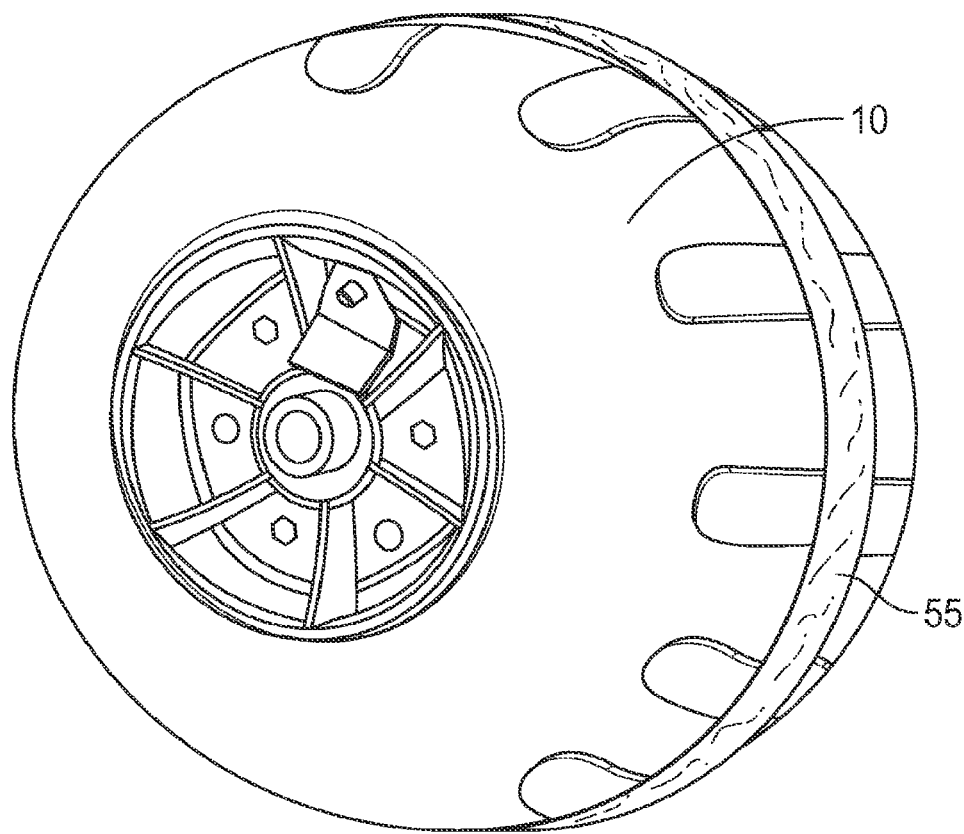
FIG. 27 illustrates a side perspective view of a tire which has the tire inflation tool wrapped around the circumference of the tire.

Referring now to FIG. 27, this figure illustrates a side perspective view of a tire 10 which has the tire inflation tool 55 wrapped around the circumference of the tire. This figure illustrates a side view of an inflatable tire 10 inflated at the optimal pressure range and being circumscribed by a tire inflation tool 55. The alphanumeric text (see FIG. 30), like "Mybeachart.com" and other like text can be printed on the tool 55.

The inventors have discovered that the circumference (C1) of the inflatable tire 10 at the optimal pressure range is one preferred way of measuring tire pressure. The tire inflation tool 55, providing the circumference of the tire 11 at the optimal pressure range, is preferred because, as explained above, most conventional tire pressure gauges are not calibrated to measure very low pressure ranges (i.e. a pressure range between 2.0 and 3.0 psi). Thus, the inventors provide the tire inflation tool 55 as part of the system 101, as part of a kit that is sold for assembling the final system 101 as illustrated in FIG. 1A.

Figure 28:
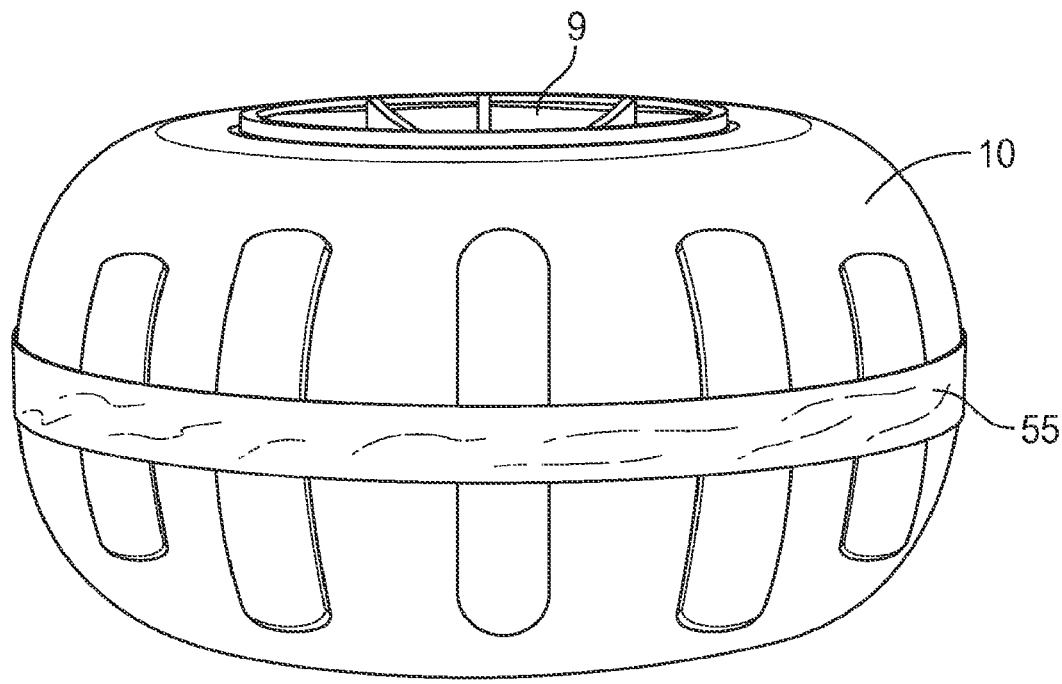
FIG. 28 illustrates another side perspective view of the tire and the tire inflation tool being wrapped around the tire.

Referring now to FIG. 28, this figure illustrates another side perspective view of the tire 10 and the tire inflation tool 55 being wrapped around the tire 10. The tire inflation tool 55 provides the ideal circumference C1 for the tire 10 once proper inflation is reached.

Figure 29A:
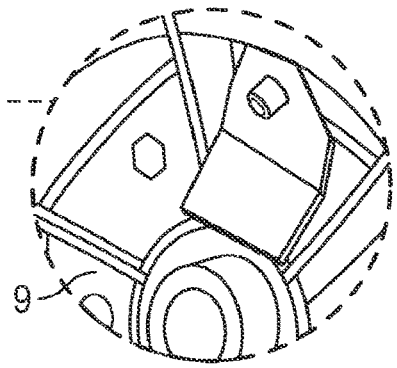
FIG. 29A illustrates an enlarged portion of FIG. 29B which includes the wheel.
Figure 29B:
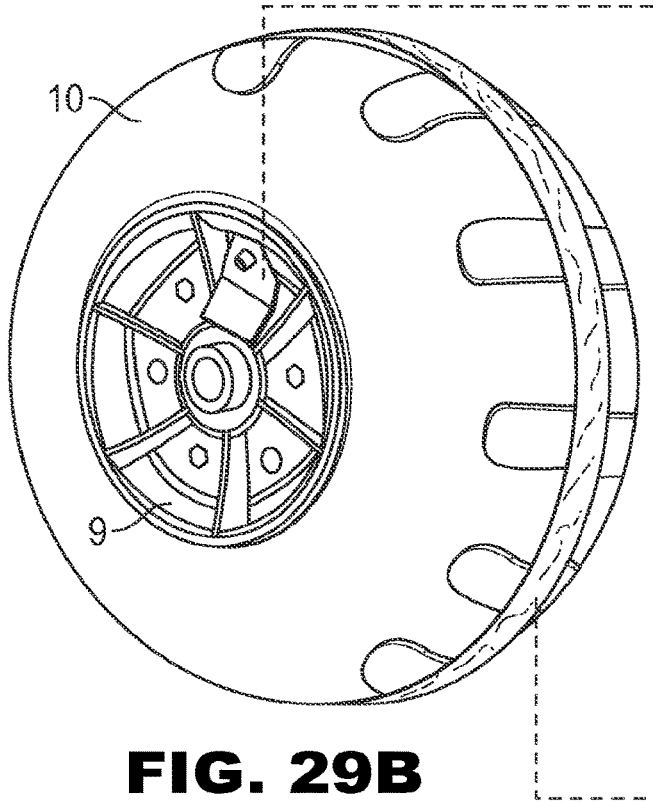
FIG. 29B illustrates a side perspective view of an inflated tire that corresponds with FIG. 29A.
Figure 29C:
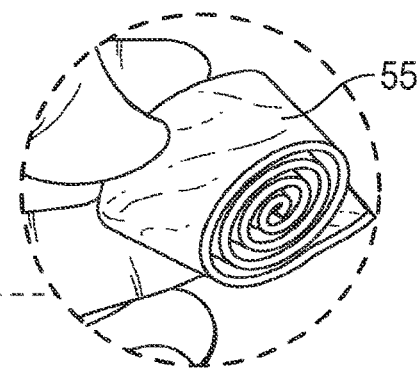
FIG. 29C illustrates a tire inflation tool corresponding to FIG. 29B.
Figure 29D:
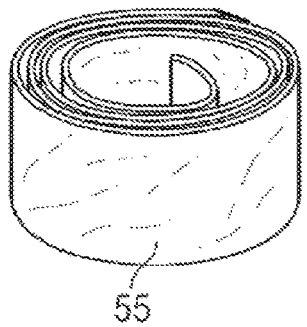
FIG. 29D illustrates a side perspective view of the tire inflation tool.

Referring now to FIG. 29A, this figure illustrates an enlarged portion of FIG. 29B which includes the wheel 9. FIG. 29B illustrates a side perspective view of an inflated tire 10 that corresponds with FIG. 29A. Meanwhile, FIG. 29C illustrates a tire inflation tool 55 corresponding to FIG. 29B. FIG. 29D illustrates a side perspective view of the tire inflation tool 55. The tire inflation tool 55 may comprise a cloth material with printing provided there upon it. Exemplary alpha-numeric text on the tool 55 may include, but is not limited to, "MyBeachCart.com." The tire inflation tool 55 is provided as a closed circle/closed loop that is fitted around each tire 10 as the tire 10 is inflated. This is one important aspect of the tire inflation tool 55: the tool 55 is provided as a closed loop and is positioned around each uninflated tire 10 before each tire is inflated so that the circumference of each tire 10 does not exceed the circumference defined by the tool 55. FIGS. 29C-29D illustrate the fire inflation tool 55 in a folded, yet closed state (i.e. folded upon itself and then wound in a circular manner) meaning that the tool 55 when opened will resemble a closed circle/loop (such as illustrated in FIGS. 1D, 1E & 29B) and as understood by one of ordinary skill in the art.

Figure 30:
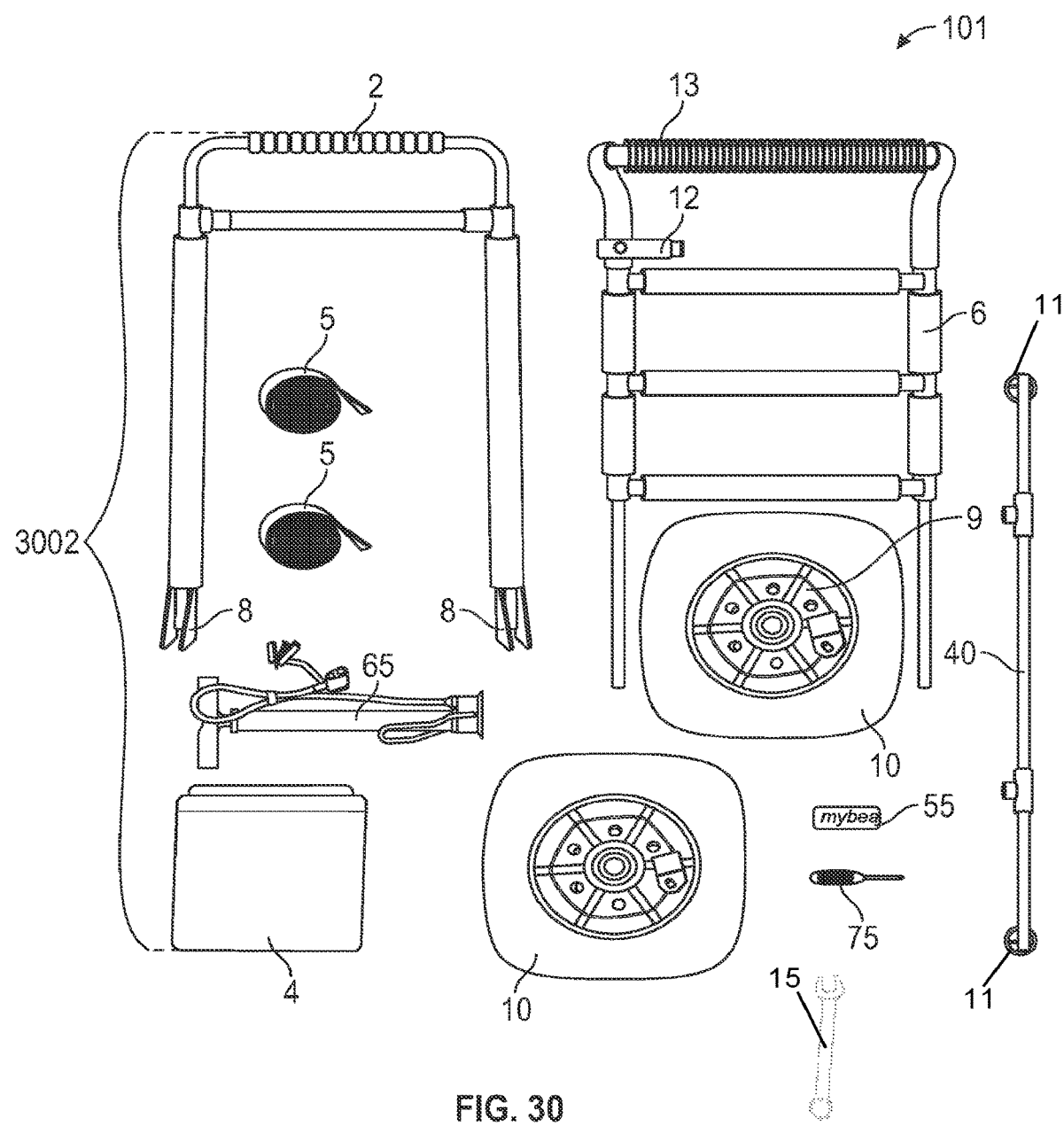
FIG. 30 illustrates components of the system in a disassembled state or otherwise referred to as being provided as components of a kit sold to consumers.

Referring now to FIG. 30, this figure illustrates components of the system 101 in a disassembled state or otherwise referred to as being provided as components of a kit 101 sold to consumers. The kit 101 may include deflated tires 10 as well as a hand-operated pump 65 in addition to a screw driver 75, a wrench 15, and at least one tire inflation tool 55. The kit 101 may further include the hand-operated air pump 65. Alternatively, the kit 101 may have an electric air pump or compressor (not shown) as understood by one of ordinary skill in the art.

Figure 31:
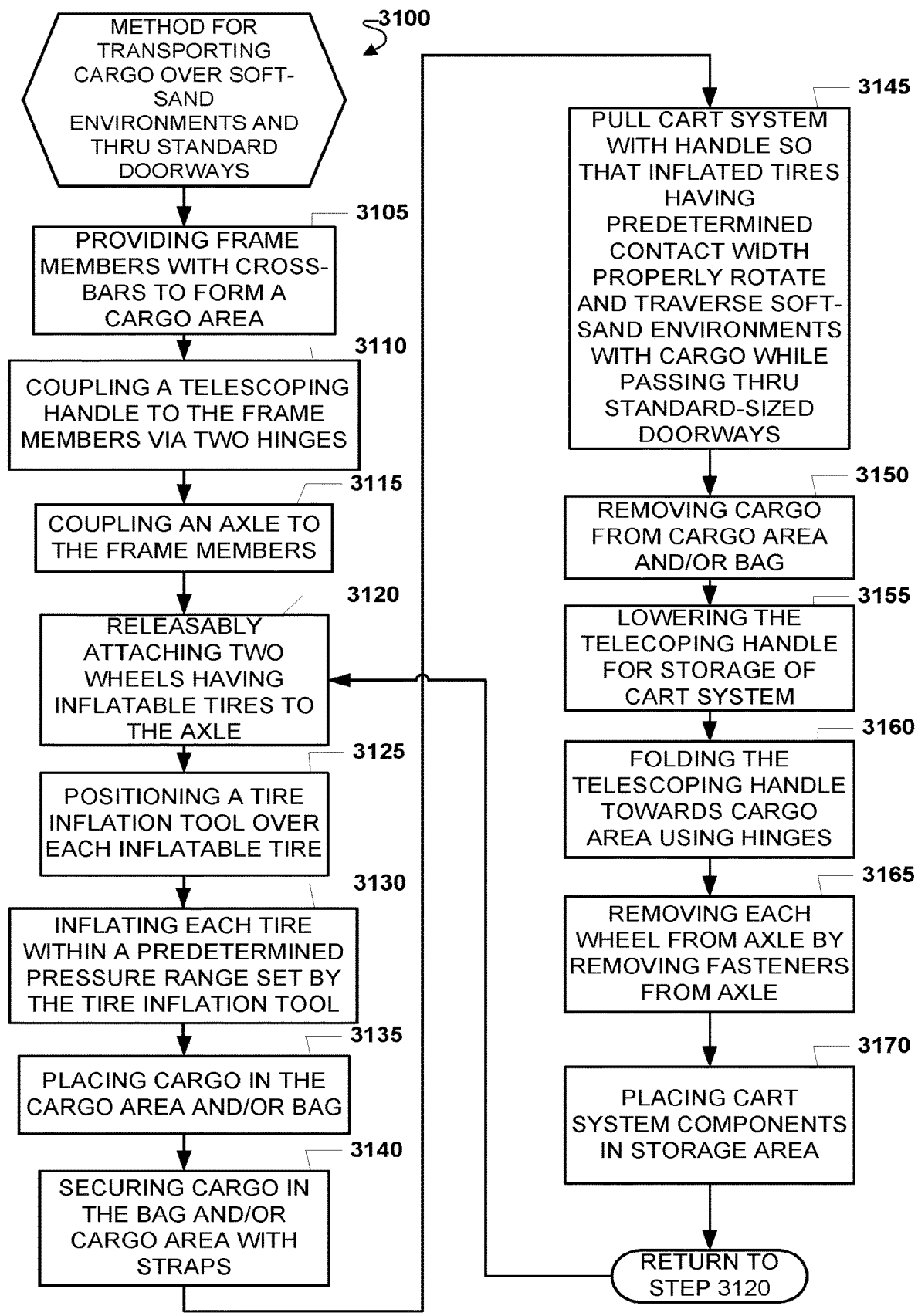
FIG. 31 illustrates a flow chart for a method of transporting cargo over soft-sand environments and through standard doorways according to one exemplary embodiment.

Referring now to FIG. 31, this figure illustrates a flow chart for a method 3100 of transporting cargo over soft-sand environments and through standard doorways according to one exemplary embodiment. Step 3105 is the first step of method 3100.

In step 3105, frame members 3 may be provided with cross-bars 21 to form a cargo area 17 as illustrated in FIG. 30 and in FIG. 1A. Next, in step 3110, a telescoping handle 2 may be coupled to the frame members 3 using two hinges 8 such as illustrated in FIG. 1A. Next, in step 3115, an axle 40 as illustrated in FIGS. 1A, 23A & 23B may be coupled to the frame members 3.

Subsequently, in step 3120, two wheels 9 having inflatable tires 10 as shown in FIG. 30 may be releasably attached to the axle 40 by using at least two fasteners 11. As noted previously, these fasteners 11 may comprise lynch pins which are re-usable and are spring-loaded. In this way, the wheels 9 can be coupled and removed from the axle 40 numerous times without any damage and/or wear of parts (i.e. without any significant wear to the fasteners 11 themselves, as well as the axle 40 and wheels 9).

Next, in step 3125, a tire inflation tool 55 may be positioned over each inflatable tire 10, such as illustrated in FIGS. 1D, 26A, and 27. Subsequently, in step 3130, each tire 10 may be inflated to a pressure within a predetermined pressure range that is set/controlled by the tire inflation tool 55. As mentioned previously, the tire inflation tool 55 may measure a circumference C1 of each tire 10 so that the tire 10 may be inflated within a predetermined pressure range to fully engage/contact the tire inflation tool, which is between about 2.0 and 3.0 Psi as described previously.

Next, in step 3135, cargo 410 such as shown in FIG. 4 may be placed in the cargo area 17 and/or in the mesh bag 4. Then, in step 3140 the cargo 410 in the cargo area may be secured in the cargo area 17 with straps 5 and/or closed within the mesh bag 4.

Subsequently, in step 3145, the cart system 101 may be pulled with the handle 2 so that the inflated tires 10 within the predetermined pressure range properly rotate around the axle 40 and traverse soft-sand environments while passing through standard-sized doorways.

As noted above, the inventors have discovered that the contact width (CW) on soft sand for each tire 10 (having a diameter of 13.0 inches with weight of only the system 101 which is about 18.0 lbs.) at the proper inflation (i.e. between about 2.0 psi and 3.0 psi), is between about 3.8 inches and 4.2 inches, and preferably at about 4.0 inches on a soft sand surface. The inflatable tires 10 with these parameters will rotate efficiently over soft sand.

For a loaded cart system 101, that includes its own weight (i.e. approximately 18.0 lbs. for the system 101 alone) and a 150.0 lb payload, a first payload force (PLF1) is generated which is distributed among the axle 40 as two payload forces (PLF2 & PLF3—See FIG. 1C). The tires 10 with a proper inflation (i.e. between about 2.0 psi and about 3.0 psi) will generally have a contact width (CW) between about 6.8 inches and 7.2 inches, and preferably about 7.0 inches in magnitude on a soft sand surface. The inflatable tires 10 with these parameters will rotate efficiently over soft sand.

The inventors have also discovered that FOR A MAXIMUM AXLE WIDTH (W40) OF 36.0 inches: The ratio of the minimum contact width (CW) for each inflatable tire 10 to maximum axle width (W40) for an unloaded cart system 101 (weight of system 101 itself) expressed as a decimal is about 0.110 (i.e. 3.8 inches for CW to 36.0 inches for W40, and where each tire has a maximum listed diameter of 13.0 inches, and a pressure range between 2.0 and 3.0 psi, and system weight of 18.0 lbs.). This means the ratio of the minimum contact width (CW) for each inflatable tire 10 to maximum axle width (W40) for a loaded cart system 101 expressed as a decimal is about 0.200 (i.e. 7.2 inches for CW to 36.0 inches for W40, and where each tire has a maximum listed diameter of 13.0 inches, and a pressure range between 2.0 and 3.0 psi, a system weight of 18.0 lbs. with a load of 150.0 lbs.).

Further, the inventors have also discovered that FOR A MAXIMUM AXLE WIDTH (W40) OF 30.5 inches: The ratio of the minimum contact width (CW) for each inflatable tire 10 to maximum axle width (W40) for an unloaded cart system 101 (weight of system 101 itself) expressed as a decimal is about 0.125 (i.e. 3.8 inches for CW to 30.5 inches for W40, and where each tire has a maximum listed diameter of 13.0 inches, and a pressure range between 2.0 and 3.0 psi, and system weight of 18.0 lbs.). This means the ratio of the minimum contact width (CW) for each inflatable tire 10 to maximum axle width (W40) for a loaded cart system 101 expressed as a decimal is about 0.240 (i.e. 7.2 inches for CW to 30.5 inches for W40, and where each tire has a maximum listed diameter of 13.0 inches, and a pressure range between 2.0 and 3.0 psi, a system weight of 18.0 lbs. with a load of 150.0 lbs.).

Referring back to FIG. 31, in step 3150, the cargo 405/410 may be removed from the cargo area 17 and/or bag 4. Next, in step 3155, the telescoping handle 2 may be lowered within the telescoping receiving support members 67. Subsequently, in step 3160, the telescoping handle 2 with telescoping support members 67 may be folded towards the cargo area 17 using the hinges 8 such as shown in FIGS. 19A-19C. Then, in step 3165, each wheel 9 may be removed from the axle 40 by removing the fasteners 11 (i.e. lynch pins) from the axle 40. Next, the disassembled cart system, as illustrated in FIG. 1F, may be placed in a storage area, such as in a vehicle 200, shown in FIG. 1F. The method 3100 may then return to step 3120 where the wheels 9 may be attached to the axle 40 with fasteners 11 (i.e. lynch pins 11).

Dimensions larger or smaller are possible than those illustrated in the several figures as understood by one of ordinary skill in the art. While all of the dimensions of the system 101 may be adjusted higher or lower than those illustrated, the inventors have discovered that the dimensions of the tire 10 are significant/important to the function of the system 101.

The exemplary embodiments of the inventive method 3100 and system 101 described above are interchangeable as understood by one of ordinary skill in the art. Various embodiments may be combined with other embodiments without departing from the scope of this disclosure. That is, one or more embodiments illustrated in the several figures may be combined together. Also, portions or parts of one figure may be substituted and/or coupled together with other parts illustrated in another figure as understood by one of ordinary skill in the art.

Further, certain steps in the processes or process flows enabled by the mechanical drawings and in the flowchart 3100 of FIG. 31 of this specification naturally precede others for the invention to function as described. However, the invention is not limited to the order of the steps described if such order or sequence does not alter the functionality of the invention.

That is, it is recognized that some steps may performed before, after, or parallel (substantially simultaneously with) other steps without departing from the scope of this disclosure. In some instances, certain steps may be omitted or not performed without departing from the invention.

Although a few embodiments have been described in detail above, those skilled in the art will readily appreciate that many modifications are possible in the embodiments without materially departing from this disclosure. Accordingly, such modifications are intended to be included within the scope of this disclosure as defined in the following claims.

For example, as noted previously, while the telescoping handle 2 may be secured in place by screw-based hand-turned handles 20 as shown in FIGS. 10-12, an alternative to such handles 20 could be button-based system where one larger diameter cylinder that receives the handle 2 may comprise a button/protrusion that may "lock" into one or more apertures (not illustrated) which may be placed in the handle 2.

Further, mechanical equivalents of any of the illustrated structures could be substituted for many of the structures illustrated in the several views as understood by one of ordinary skill in the art. Such substitutions of mechanical/electrical equivalent structures are included within the scope of this disclosure.

Similarly, in the claims, means-plus-function clauses are intended to cover the structures described herein as performing the recited function and not only structural equivalents, but also equivalent structures. It is the express intention of the applicant not to invoke 35 U.S.C. § 112, sixth paragraph for any limitations of any of the claims herein, except for those in which the claim expressly uses the words 'means for' together with an associated function.

Therefore, although selected aspects have been illustrated and described in detail, it will be understood that various substitutions and alterations may be made therein without departing from the spirit and scope of the present invention, as defined by the following claims.

What is claimed is:

1. A beach cart kit comprising:
a handle;
a telescoping support member coupled to the handle, the telescoping support member allowing the handle to move between a first position and a second position;
a cargo deck coupled to the telescoping support member via a first hinge and a second hinge that defines a pivot line, the first and second hinges permitting the telescoping support member with the handle to rotate around said pivot line towards the cargo deck when an assembled beach cart is placed in a storage state, the cargo deck comprising a first tubular member and a second tubular member;
an axle coupled to the cargo deck for supporting two wheels, wherein the axle is coupled to the first tubular member by a first t-shaped connector and the axle is coupled to the second tubular member via a second t-shaped connector such that the axle forms a ninety degree angle with each tubular member, the first hinge being coupled to the first tubular member at a first point, the second hinge being coupled to the second tubular member at a second point, a first distance being defined between the first point and where the axle passes through the first t-shaped connector, a second distance being defined between the second point and where the axle passes through the second t-shaped connector, each t-shaped connector keeping the axle stationary relative to the first and second tubular members when the telescoping support member with the handle rotate around said pivot line, each wheel having an inflatable tire where each wheel and each inflatable tire when inflated define a single radius with the axle being a center point of each radius, said first distance and said second distance each being greater than each radius when each inflatable tire is inflated, and
a tire inflation tool providing a predetermined circumference for each inflatable tire, the tire inflation tool providing the predetermined circumference corresponding to the predetermined pressure range.

2. The kit of claim 1, wherein each wheel with its inflatable tire is removable from the axle when the assembled beach cart is placed in the storage state.

3. The kit of claim 1, wherein each tire is inflated within a predetermined pressure range such that each tire rotates properly over soft-sand environments when supporting the cargo deck along with any cargo.

4. The kit of claim 3, wherein the predetermined pressure range is between about 2.0 psi and about 3.0 psi and each tire diameter is between about 10.00 and 13.50 inches when a cart is assembled and loaded.

5. The kit of claim 3, wherein each tire has a contact width on a sand surface between 3.8 inches and 7.2 inches when the cart system loaded.

6. The kit of claim 1, wherein the predetermined circumference is about 42.0 inches.

7. The kit of claim 4, wherein a ratio of a minimum contact width (CW) for each inflatable tire to maximum axle width for an unloaded cart expressed as a decimal is about 0.110, and the ratio of a maximum contact width (CW) for each inflatable tire 10 to maximum axle width (W40) for a loaded cart expressed as a decimal is about 0.200.

8. The kit of claim 1, further comprising a first pin and a second pin for holding the wheels on axle when the assembled beach cart is in an operational state, the first pin and second pin being removable to allow the wheels to be removed from the axle when the assembled beach cart is in a storage state.

9. The kit of claim 8, wherein each wheel is coupled to the axle without any bearings or other hardware.

10. A beach cart system comprising:
a handle;
a telescoping support member coupled to the handle, the telescoping support member allowing the handle to move between a first position and a second position;
a cargo deck coupled to the telescoping support member via a first hinge and a second hinge that defines a pivot line, the first and second hinges permitting the telescoping support member with the handle to rotate around said pivot line towards the cargo deck when the beach cart system is placed in a storage state, the cargo deck comprising a first tubular member and a second tubular member;
an axle coupled to the cargo deck for supporting two wheels, wherein the axle is coupled to the first tubular member by a first t-shaped connector and the axle is coupled to the second tubular member via a second t-shaped connector such that the axle forms a ninety degree angle with each tubular member, the first hinge being coupled to the first tubular member at a first point, the second hinge being coupled to the second tubular member at a second point, a first distance being defined between the first point and where the axle passes through the first t-shaped connector, a second distance being defined between the second point and where the axle passes through the second t-shaped connector, each t-shaped connector keeping the axle stationary relative to the first and second tubular members when the telescoping support member with the handle rotate around said pivot line, each wheel having an inflatable tire where each wheel and each inflatable tire when inflated define a single radius with the axle being a center point of each radius, said first distance and said second distance each being greater than each radius when each inflatable tire is inflated.

11. The system of claim 10, wherein each tire is inflated within a predetermined pressure range such that each tire rotates properly over soft-sand environments when supporting the cargo deck along with any cargo, wherein the predetermined pressure range is between about 2.0 psi and 3.0 psi.

12. The system of claim 10, wherein each wheel with its inflatable tire is removable from the axle when the beach cart system is placed in the storage state.

13. The system of claim 10, wherein each tire has a diameter that is between about 10.00 and 13.50 inches when the beach cart system is in an operational state.

14. The system of claim 13, wherein each tire has a contact width on a sand surface between 3.8 inches and 7.2 inches when the beach cart system loaded.

15. The system of claim 10, wherein each tire has a predetermined circumference of about 42.0 inches.

16. The system of claim 10, wherein a ratio of a minimum contact width (CW) for each inflatable tire to maximum axle width for an unloaded cart expressed as a decimal is about 0.110, and the ratio of a maximum contact width (CW) for each inflatable tire 10 to maximum axle width (W40) for a loaded cart expressed as a decimal is about 0.200.

17. The system of claim 10, further comprising a first pin and a second pin for holding the wheels on axle when the beach cart system is in an operational state, the first pin and second pin being removable to allow the wheels to be removed from the axle when the beach cart system is in a storage state.

18. The system of claim 17, wherein the first pin and second pin each comprise a lynch pin.

19. The system of claim 10, wherein the cargo deck comprises a plurality of cross-bars coupled to a frame member.

20. The system of claim 10, wherein each wheel has direct contact with the axle.

* * * * *